(12) United States Patent
Zeiber et al.

(10) Patent No.: US 7,762,279 B2
(45) Date of Patent: Jul. 27, 2010

(54) THREADED COUPLING WITH FLOW SHUTOFF

(75) Inventors: Dennis Zeiber, Erie, PA (US); Steve Wilkins, Union City, PA (US)

(73) Assignee: Snap-Tite Technologies, Inc., Wilmington, DE (US)

(*) Notice: Subject to any disclaimer, the term of this patent is extended or adjusted under 35 U.S.C. 154(b) by 0 days.

(21) Appl. No.: 12/175,774

(22) Filed: Jul. 18, 2008

(65) Prior Publication Data

US 2008/0271797 A1 Nov. 6, 2008

Related U.S. Application Data

(63) Continuation-in-part of application No. 11/267,482, filed on Nov. 5, 2005, now Pat. No. 7,575,024.

(51) Int. Cl.
*F16L 37/23* (2006.01)

(52) U.S. Cl. .................. 137/614.05; 137/614.03; 251/149.1; 251/149.6

(58) Field of Classification Search .................. 137/614.03–614.05; 251/149.1, 149.6
See application file for complete search history.

(56) References Cited

U.S. PATENT DOCUMENTS

| | | | |
|---|---|---|---|
| 2,492,271 A * | 12/1949 | Cox et al. | 137/614.03 |
| 3,224,728 A | 12/1965 | Buseth | |
| 3,464,436 A | 9/1969 | Bruning | |
| 3,613,726 A * | 10/1971 | Torres | 137/614.03 |
| 3,930,674 A | 1/1976 | Jonsson | |

(Continued)

FOREIGN PATENT DOCUMENTS

EP 0 686 801 A1 12/1995

(Continued)

OTHER PUBLICATIONS

International Preliminary Report on Patentability, Jun. 6, 2008, PCT/US06/22848 Corresponding to U.S. Appl. No. 11/267,482.

(Continued)

*Primary Examiner*—Kevin L Lee
(74) *Attorney, Agent, or Firm*—Woodling, Krost and Rust

(57) ABSTRACT

A thread to connect coupling comprising a female coupling half and a male coupling half is disclosed and claimed wherein the male coupling half includes a recess in the exterior of the male body which extends circumferentially therearound. The female coupling half includes a valve, a female body, and a female body extension affixed to the female body. The female body further includes a sliding sleeve movable with respect to the valve between a first position abutting and closing the valve and a second position opening the valve. The male body interengages the sliding sleeve and moves therewith during coupling and uncoupling. During uncoupling, the sliding sleeve is reliably positioned sealingly against the valve because the sliding sleeve is interlocked with the male body such that as the male body is withdrawn from the female body the sliding sleeve comes with the male body. Separation of the coupling halves requires that an outer sleeve release a second set of detents which acts as a permissive to uncoupling. The coupling halves may not be separated by vibrating the threaded surfaces of the respective coupling halves apart.

12 Claims, 12 Drawing Sheets

U.S. PATENT DOCUMENTS

| | | |
|---|---|---|
| 3,957,292 A | 5/1976 | Diggs |
| 3,973,791 A | 8/1976 | Porta et al. |
| 3,976,313 A | 8/1976 | Lauffenburger |
| 4,005,735 A | 2/1977 | Miyamoto |
| 4,030,798 A | 6/1977 | Paoli |
| 4,039,213 A | 8/1977 | Walters |
| 4,063,756 A | 12/1977 | Anderson |
| 4,074,698 A | 2/1978 | Hobson et al. |
| 4,082,319 A | 4/1978 | Berger et al. |
| 4,098,292 A | 7/1978 | Evans |
| 4,125,279 A | 11/1978 | Scott |
| 4,126,338 A | 11/1978 | Coel et al. |
| 4,148,459 A | 4/1979 | Martinez |
| 4,157,196 A | 6/1979 | De Meulemeester |
| 4,166,475 A | 9/1979 | Gano |
| 4,198,076 A | 4/1980 | Mezei |
| 4,199,131 A | 4/1980 | Boski et al. |
| 4,210,348 A | 7/1980 | Hobson et al. |
| 4,211,253 A | 7/1980 | Ekman |
| 4,219,048 A | 8/1980 | Ekman |
| 4,221,235 A | 9/1980 | Maldavs |
| 4,236,736 A | 12/1980 | Anderson |
| 4,258,936 A | 3/1981 | Goldberg |
| 4,269,389 A | 5/1981 | Ekman |
| 4,286,807 A | 9/1981 | Bachli |
| 4,289,164 A | 9/1981 | Ekman |
| 4,313,628 A | 2/1982 | Duenke |
| 4,330,142 A | 5/1982 | Paini |
| 4,335,747 A | 6/1982 | Mitsumoto et al. |
| 4,347,870 A | 9/1982 | Maldavs |
| 4,348,039 A | 9/1982 | Miller |
| 4,350,321 A | 9/1982 | Berg |
| 4,366,945 A | 1/1983 | Blauenstein |
| 4,373,551 A | 2/1983 | Shindelar |
| 4,392,513 A | 7/1983 | Parrish |
| 4,398,561 A | 8/1983 | Maldavs |
| 4,407,482 A | 10/1983 | Daghe et al. |
| 4,407,529 A | 10/1983 | Holman |
| 4,442,863 A | 4/1984 | Magorien |
| 4,443,028 A | 4/1984 | Hayes |
| 4,449,739 A | 5/1984 | Raether |
| 4,470,490 A | 9/1984 | Morel |
| 4,477,109 A | 10/1984 | Kleuver |
| 4,486,037 A | 12/1984 | Shotbolt |
| 4,487,462 A | 12/1984 | Gale et al. |
| 4,496,173 A | 1/1985 | Roche et al. |
| 4,502,662 A | 3/1985 | Maldavs et al. |
| 4,527,816 A | 7/1985 | Bresie et al. |
| 4,543,993 A | 10/1985 | Calvin et al. |
| 4,543,994 A | 10/1985 | Johnson et al. |
| 4,543,995 A | 10/1985 | Weh et al. |
| 4,546,956 A | 10/1985 | Moberg |
| 4,549,576 A | 10/1985 | Angel |
| 4,564,042 A | 1/1986 | Ekman |
| 4,565,392 A | 1/1986 | Vyse |
| 4,583,711 A | 4/1986 | Johnson |
| 4,588,213 A | 5/1986 | Bollfrass et al. |
| 4,596,272 A | 6/1986 | Medvick et al. |
| 4,597,413 A | 7/1986 | Buseth |
| 4,598,896 A | 7/1986 | Maldavs |
| 4,616,856 A | 10/1986 | Kowalyshen |
| 4,618,173 A | 10/1986 | Dopyera et al. |
| 4,625,998 A | 12/1986 | Draudt et al. |
| 4,647,075 A | 3/1987 | Vargo |
| 4,650,221 A | 3/1987 | Caillouet, Jr. |
| 4,650,529 A | 3/1987 | Guest |
| 4,671,540 A | 6/1987 | Medvick et al. |
| 4,688,830 A | 8/1987 | Meisinger et al. |
| 4,688,831 A | 8/1987 | Viehmann |
| 4,691,941 A | 9/1987 | Rabushka et al. |
| 4,702,278 A | 10/1987 | Badoreaux |
| 4,703,774 A | 11/1987 | Seehausen |
| 4,738,463 A | 4/1988 | Poore et al. |
| 4,745,948 A | 5/1988 | Wilcox et al. |
| 4,768,551 A | 9/1988 | Allread et al. |
| 4,786,029 A | 11/1988 | Laipply et al. |
| 4,792,163 A | 12/1988 | Kulle |
| 4,794,937 A | 1/1989 | Hofmann |
| 4,827,977 A | 5/1989 | Fink, Jr. |
| 4,835,873 A | 6/1989 | Weems |
| 4,836,584 A | 6/1989 | Baker |
| 4,846,506 A | 7/1989 | Bocson et al. |
| 4,854,345 A | 8/1989 | Badoreaux |
| 4,861,209 A | 8/1989 | Larsson |
| 4,865,077 A | 9/1989 | Batchen et al. |
| 4,865,292 A | 9/1989 | Ekman |
| 4,887,849 A | 12/1989 | Briet |
| 4,896,697 A | 1/1990 | Stromdahl |
| 4,898,199 A | 2/1990 | Morris et al. |
| 4,904,001 A | 2/1990 | Sasa et al. |
| 4,904,002 A | 2/1990 | Sasa et al. |
| 4,905,965 A | 3/1990 | Dolev |
| 4,907,830 A | 3/1990 | Sasa et al. |
| 4,911,194 A | 3/1990 | Lechner |
| 4,913,855 A | 4/1990 | Panzica |
| 4,915,423 A | 4/1990 | Wallace |
| 4,923,349 A | 5/1990 | Logsdon |
| 4,924,909 A | 5/1990 | Wilcox |
| 4,944,377 A | 7/1990 | Elsner |
| 4,955,645 A | 9/1990 | Weems |
| 4,966,398 A | 10/1990 | Peterson |
| 4,974,635 A | 12/1990 | Hanus et al. |
| 4,981,311 A | 1/1991 | Kinney |
| 4,982,929 A | 1/1991 | Spurling |
| 5,004,209 A | 4/1991 | Paquette |
| 5,009,252 A | 4/1991 | Faughn |
| 5,015,017 A | 5/1991 | Geary |
| 5,016,920 A | 5/1991 | Anderson |
| 5,027,855 A | 7/1991 | Jaggi |
| 5,031,941 A | 7/1991 | Bartholomew |
| 5,042,850 A | 8/1991 | Culler |
| 5,063,965 A | 11/1991 | Wilcox |
| 5,070,597 A | 12/1991 | Holt et al. |
| 5,072,755 A | 12/1991 | Wilcox |
| 5,083,890 A | 1/1992 | Gabilondo |
| 5,088,866 A | 2/1992 | Ischebeck et al. |
| 5,096,235 A | 3/1992 | Oetiker |
| 5,103,868 A | 4/1992 | Wilkins |
| 5,107,930 A | 4/1992 | Hopper |
| 5,120,092 A | 6/1992 | Gorog et al. |
| 5,123,446 A | 6/1992 | Haunhorst et al. |
| 5,123,448 A | 6/1992 | Kjelberg |
| 5,139,049 A | 8/1992 | Jensen et al. |
| 5,141,014 A | 8/1992 | Poli et al. |
| 5,149,053 A | 9/1992 | Galli |
| 5,152,554 A | 10/1992 | LaFleur et al. |
| 5,159,955 A | 11/1992 | Ekman |
| 5,165,728 A | 11/1992 | Mayer |
| 5,174,611 A | 12/1992 | Byrd et al. |
| 5,188,399 A | 2/1993 | Durina |
| 5,191,914 A | 3/1993 | Gonzalez |
| 5,192,219 A | 3/1993 | Fowler et al. |
| 5,195,785 A | 3/1993 | Jellison |
| 5,203,477 A | 4/1993 | Lo |
| 5,205,002 A | 4/1993 | Sage-Passant |
| 5,222,520 A | 6/1993 | Anderson et al. |
| 5,222,772 A | 6/1993 | McGraw |
| 5,226,682 A | 7/1993 | Marrison et al. |
| 5,234,437 A | 8/1993 | Sepetka |
| 5,239,848 A | 8/1993 | Nichols, Jr. |
| 5,248,306 A | 9/1993 | Clark et al. |
| 5,251,940 A | 10/1993 | DeMoss et al. |
| 5,255,714 A | 10/1993 | Mullins |
| 5,261,240 A | 11/1993 | Oyler et al. |

| | | | | | |
|---|---|---|---|---|---|
| 5,273,071 A | 12/1993 | Oberrecht | 5,934,709 A | 8/1999 | Morrison |
| 5,293,902 A | 3/1994 | Lapierie | 5,937,899 A | 8/1999 | Zeiber |
| 5,316,033 A | 5/1994 | Schumacher et al. | 5,947,071 A | 9/1999 | Alcamo |
| 5,316,347 A | 5/1994 | Arosio | 5,947,532 A | 9/1999 | Lorenz |
| 5,316,352 A | 5/1994 | Smith | 5,951,728 A | 9/1999 | Hopson |
| 5,320,133 A | 6/1994 | Nimberger | 5,954,370 A | 9/1999 | Pietersen |
| 5,322,331 A | 6/1994 | Waldschmidt et al. | 5,961,159 A | 10/1999 | Ekman |
| 5,323,812 A | 6/1994 | Wayne | 5,964,484 A | 10/1999 | Bartholomew |
| 5,325,890 A | 7/1994 | Wilkins | 5,971,787 A | 10/1999 | Brown |
| 5,328,209 A | 7/1994 | Cromwell | 5,975,589 A | 11/1999 | Wilkins |
| 5,337,782 A | 8/1994 | Wilcox | 5,984,266 A | 11/1999 | Kotake |
| 5,342,098 A | 8/1994 | Wilkins | 5,988,697 A | 11/1999 | Arosio |
| 5,360,035 A | 11/1994 | Smith | 5,992,903 A | 11/1999 | Bartholomew |
| 5,362,109 A | 11/1994 | Pacht | 6,007,106 A | 12/1999 | Wilkins |
| 5,366,259 A | 11/1994 | Hohmann et al. | 6,009,901 A | 1/2000 | Roberts |
| 5,378,100 A | 1/1995 | Fullerton | 6,016,835 A | 1/2000 | Maldavs |
| 5,388,874 A | 2/1995 | Barrier | 6,026,857 A | 2/2000 | Stucchi |
| 5,390,963 A | 2/1995 | Namekawa | 6,033,169 A | 3/2000 | Bettger |
| 5,404,909 A | 4/1995 | Hanson | 6,050,298 A | 4/2000 | Larcroix et al. |
| 5,413,387 A | 5/1995 | Bartholomew | 6,053,540 A | 4/2000 | Meyer |
| 5,443,291 A | 8/1995 | Stucchi | 6,068,044 A | 5/2000 | Fahl |
| 5,452,736 A | 9/1995 | Arosio | 6,073,974 A | 6/2000 | Meisinger |
| 5,454,602 A | 10/1995 | Anderson et al. | 6,086,113 A | 7/2000 | Bartholomew |
| 5,535,984 A | 7/1996 | Anderson et al. | 6,095,190 A | 8/2000 | Wilcox et al. |
| 5,540,250 A | 7/1996 | Mullins | 6,099,044 A | 8/2000 | Weh et al. |
| 5,546,985 A | 8/1996 | Bartholomew | 6,116,277 A | 9/2000 | Wilcox et al. |
| 5,553,893 A | 9/1996 | Foti | 6,122,177 A | 9/2000 | Kitano et al. |
| 5,553,895 A | 9/1996 | Karl et al. | 6,135,509 A | 10/2000 | Billington, III |
| 5,556,139 A | 9/1996 | Wilkins | 6,142,538 A | 11/2000 | Volgstadt |
| 5,564,471 A | 10/1996 | Wilder et al. | 6,145,539 A | 11/2000 | Wilcox et al. |
| 5,575,510 A | 11/1996 | Weh et al. | 6,155,294 A | 12/2000 | Cornford et al. |
| 5,580,200 A | 12/1996 | Fullerton | 6,158,717 A | 12/2000 | Van Scyoc et al. |
| 5,592,970 A | 1/1997 | Stucchi et al. | 6,206,431 B1 | 3/2001 | Street |
| 5,607,139 A | 3/1997 | Kjelberg | 6,254,144 B1 | 7/2001 | Hagan |
| 5,613,816 A | 3/1997 | Cabahug | 6,267,418 B1 | 7/2001 | Hogue et al. |
| 5,623,959 A | 4/1997 | Granmoe | 6,279,962 B1 | 8/2001 | McGarian et al. |
| 5,628,344 A | 5/1997 | Roberts | 6,283,151 B1 | 9/2001 | Countryman et al. |
| D383,378 S | 9/1997 | Schrader et al. | 6,283,443 B1 | 9/2001 | Taneya |
| 5,662,141 A | 9/1997 | Arosio | 6,286,877 B1 | 9/2001 | Mendoza et al. |
| 5,681,061 A | 10/1997 | Olson | 6,298,876 B1 | 10/2001 | Bogdonoff et al. |
| 5,707,086 A | 1/1998 | Treu et al. | 6,312,339 B1 | 11/2001 | Beyert |
| 5,709,416 A | 1/1998 | Wood | 6,328,352 B1 | 12/2001 | Geppert et al. |
| 5,713,607 A | 2/1998 | Webb | 6,338,504 B1 | 1/2002 | Hilliard |
| 5,730,185 A | 3/1998 | Wilkins | 6,357,811 B1 | 3/2002 | Nakamura |
| 5,732,984 A | 3/1998 | Bartholomew | 6,358,078 B1 | 3/2002 | Crippa |
| 5,733,084 A | 3/1998 | Fullerton | 6,364,369 B2 | 4/2002 | Bailey |
| 5,746,454 A | 5/1998 | Webb | 6,375,152 B1 | 4/2002 | Weh et al. |
| 5,752,690 A | 5/1998 | Ellet | 6,382,251 B1 | 5/2002 | Hopson |
| 5,752,726 A | 5/1998 | Fixemer | 6,386,596 B1 | 5/2002 | Olson |
| 5,775,738 A | 7/1998 | Bartholomew | 6,398,268 B1 | 6/2002 | Takahashi et al. |
| 5,788,443 A | 8/1998 | Cabahug | 6,408,880 B1 | 6/2002 | Kaul |
| 5,800,108 A | 9/1998 | Cabahug | 6,422,267 B1 | 7/2002 | Makishima et al. |
| 5,806,564 A | 9/1998 | Wilcox | 6,439,558 B1 | 8/2002 | Arosio |
| 5,806,832 A | 9/1998 | Larbuisson | 6,516,880 B1 | 2/2003 | Otten et al. |
| 5,816,621 A | 10/1998 | Frost | 6,517,344 B2 | 2/2003 | Scanlon |
| 5,816,623 A | 10/1998 | Chang | 6,523,861 B1 | 2/2003 | Clancy et al. |
| 5,823,222 A | 10/1998 | Minshull et al. | 6,523,863 B2 | 2/2003 | Ishiwata |
| 5,841,095 A | 11/1998 | Lu et al. | 6,543,812 B1 | 4/2003 | Chang |
| 5,853,204 A | 12/1998 | Bartholomew | 6,557,824 B1 | 5/2003 | Jenski, Jr. et al. |
| 5,857,713 A | 1/1999 | Horimoto | 6,557,899 B2 | 5/2003 | Martine-Cocher et al. |
| 5,863,079 A | 1/1999 | Donais et al. | 6,557,904 B2 | 5/2003 | Naito |
| 5,871,239 A | 2/1999 | Boscaljon et al. | 6,561,551 B2 | 5/2003 | Kawakami et al. |
| 5,873,386 A | 2/1999 | Arosio | 6,565,127 B2 | 5/2003 | Webb |
| 5,881,769 A | 3/1999 | Hopson | 6,568,717 B1 | 5/2003 | Le Clinche |
| 5,884,897 A | 3/1999 | Arosio | 6,588,806 B2 | 7/2003 | Arosio |
| 5,890,517 A | 4/1999 | Laible | 6,588,807 B1 | 7/2003 | Burke et al. |
| 5,893,391 A | 4/1999 | Jenski, Jr. | 6,592,151 B2 | 7/2003 | Densel et al. |
| 5,911,445 A | 6/1999 | Lee | 6,604,762 B2 | 8/2003 | Sagaser |
| 5,918,633 A | 7/1999 | Zeiber | 6,629,707 B1 | 10/2003 | Yamaguchi et al. |
| 5,921,588 A | 7/1999 | Vogel et al. | 6,655,656 B2 | 12/2003 | Maldavs |
| 5,924,747 A | 7/1999 | Miyashita | 6,659,130 B2 | 12/2003 | Arosio |
| 5,927,683 A | 7/1999 | Weh et al. | 6,672,626 B1 | 1/2004 | Schafer et al. |
| 5,927,761 A | 7/1999 | Bartholomew | 6,675,833 B2 | 1/2004 | Maldavs |

| | | |
|---|---|---|
| 6,675,841 B2 | 1/2004 | Burns |
| 6,682,106 B2 | 1/2004 | Parker |
| 6,684,906 B2 | 2/2004 | Burns et al. |
| 6,691,978 B1 | 2/2004 | Bartos et al. |
| 6,715,801 B2 | 4/2004 | Zhadanov |
| 6,719,270 B2 | 4/2004 | Ozawa |
| 6,722,701 B1 | 4/2004 | Godinez |
| 6,749,231 B2 | 6/2004 | LeMay et al. |
| 6,776,187 B1 | 8/2004 | Marquis et al. |
| 6,779,777 B2 | 8/2004 | Kouda |
| 6,785,053 B2 | 8/2004 | Savage, Jr. |
| 6,811,187 B2 | 11/2004 | Otten et al. |
| 6,814,340 B2 | 11/2004 | Arosio |
| 6,830,059 B1 | 12/2004 | Zeiber et al. |
| 6,840,276 B2 | 1/2005 | Zeiber et al. |
| 6,843,506 B2 | 1/2005 | Osborne |
| 6,854,772 B2 | 2/2005 | Weller et al. |
| 6,866,064 B2 | 3/2005 | Nanni, Jr. et al. |
| 6,871,878 B2 | 3/2005 | Miros |
| 6,880,859 B2 | 4/2005 | Breay et al. |
| 6,910,719 B1 | 6/2005 | Zeleny et al. |
| 6,916,008 B2 | 7/2005 | Noble et al. |
| 6,926,031 B2 | 8/2005 | Zeiber et al. |
| 6,926,310 B1 | 8/2005 | Weh et al. |
| 6,935,614 B2 | 8/2005 | Schneller et al. |
| 6,938,636 B1 | 9/2005 | Nimberger |
| 6,945,273 B2 | 9/2005 | Reid |
| 6,962,347 B2 | 11/2005 | Smith, III |
| 6,971,684 B2 | 12/2005 | Ferrari |
| 2002/0038955 A1 | 4/2002 | Persohn et al. |
| 2002/0062869 A1 | 5/2002 | Toyokawa et al. |
| 2002/0109351 A1 | 8/2002 | Densel et al. |
| 2002/0113431 A1 | 8/2002 | LeMay et al. |
| 2002/0134959 A1 | 9/2002 | Noble et al. |
| 2002/0149200 A1 | 10/2002 | Fumioka |
| 2002/0185864 A1 | 12/2002 | LeMay et al. |
| 2003/0057699 A1 | 3/2003 | Persohn et al. |
| 2004/0070197 A1 | 4/2004 | Densel et al. |
| 2004/0079423 A1 | 4/2004 | Miyika et al. |
| 2004/0103946 A1 | 6/2004 | Nanni, Jr. et al. |
| 2004/0124634 A1 | 7/2004 | Arosio |
| 2004/0169372 A1 | 9/2004 | LeMay et al. |
| 2004/0244848 A1 | 12/2004 | Maldavs |
| 2005/0005975 A1 | 1/2005 | Marrison et al. |
| 2005/0098753 A1 | 5/2005 | Ozaki et al. |
| 2005/0116466 A1 | 6/2005 | Arosio |
| 2005/0206160 A1 | 9/2005 | Ericksen et al. |
| 2005/0242581 A1 | 11/2005 | Nowling et al. |
| 2007/0102051 A1 | 5/2007 | Zeiber et al. |

FOREIGN PATENT DOCUMENTS

| | | |
|---|---|---|
| EP | 0 862 010 B1 | 1/2000 |
| EP | 0 787 905 B1 | 11/2002 |
| EP | 1 431 648 A1 | 12/2003 |
| EP | 1 273 844 B1 | 12/2004 |
| EP | 1 538 385 A1 | 6/2005 |
| WO | WO/2007/053199 | 10/2007 |

OTHER PUBLICATIONS

International Search Report, Aug. 3, 2007, PCT/US06/22848 Corresponding to U.S. Appl. No. 11/267,482.

Written Opinion, Aug. 3, 2007, PCT/US06/22848 Corresponding to U.S. Appl. No. 11/267,482.

Faster,Screw-On Quick-Release Couplings, CAT.0114-GB, pp. 1-33, Faster, CAT 114/03-03-GB, Faster S.p. A.

Snap-tite, 78 Series—Thread to Connect Couplings, pp. 1-4, 01-0016 BE-0200, Snap-tite Erie, PA USA.

Snap-tite, Snap-tite QD & V: 75 Series, Snap-tite Quick Disconnect & Valve Division, 2006, pp. 1-2, Snap-tite Erie, PA USA.

Snap-tite, Snap-tite QD & V: 76 Series, Snap-tite Quick Disconnect & Valve Division, 2006, pp. 1-2, Snap-tite, Erie, PA USA.

Snap-tite, Snap-tite QD & V: 78 Series, Snap-tite Quick Disconnect & Valve Division, 2006, pp. 1-2, Snap-tite, Erie, PA USA.

Snap-tite, Snap-tite Coupling Assembly 75 Series, Drawing No. A199 Rev. EB, Oct. 11, 2004, A199 pp. 1, Snap-tite Inc. Union City, PA USA.

Snap-tite, Snap-tite Coupling Assembly 76 Series, Drawing No. A109, May 16, 1984, A109 p. 1, Snap-tite Inc. Union City, PA USA.

Faster,Screw-On Quick-Release Couplings, CAT.0114-GB, pp. 1-33, at least as early as Nov. 4, 2005, Faster, CAT 114/03-03-GB, Faster S.p.A.

Snap-tite, 78 Series - Thread to Connect Couplings, pp. 1-4, Feb. 2000, 01-0016 BE-0200, Snap-tite Erie, PA USA.

* cited by examiner

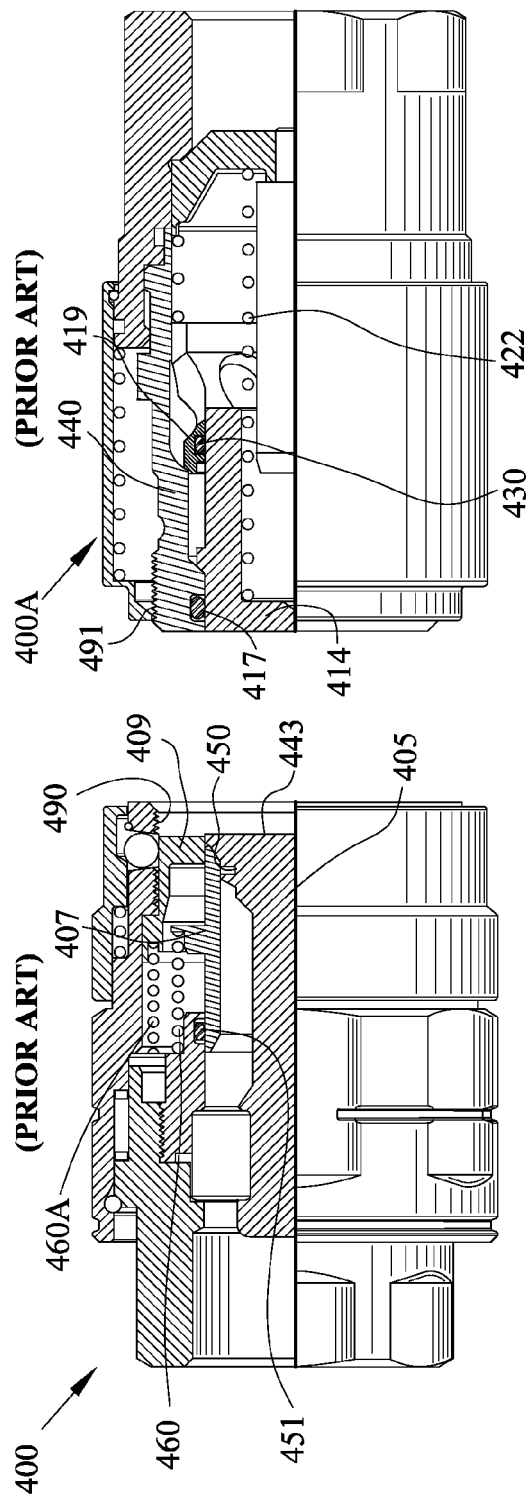
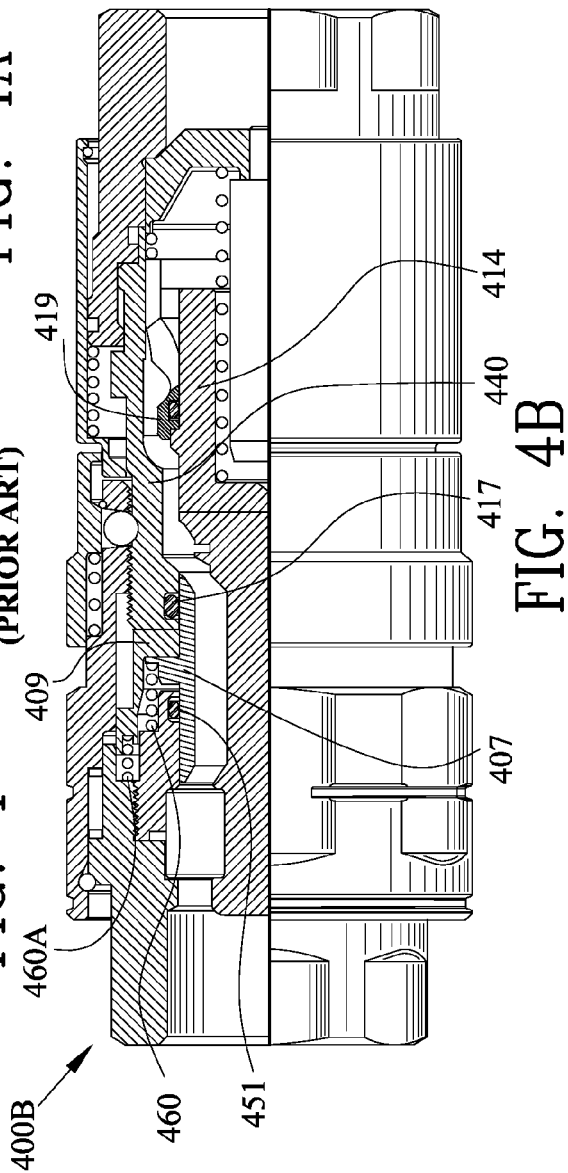

THREADED COUPLING WITH FLOW SHUTOFF

This application is a continuation in part of application Ser. No. 11/267,482 filed Nov. 5, 2005, now U.S. Pat. No. 7,575,024, and the inventors of the parent application and the instant application are the same.

FIELD OF THE INVENTION

The invention is in the field of flush face couplings which are threaded together under pressure applied to both the male coupling half and the female coupling half. The coupling of the invention may be used in construction, agriculture and in various manufacturing processes.

BACKGROUND OF THE INVENTION

U.S. Pat. No. 5,662,141 to Arosio issued Sep. 2, 1997 discloses a leak resistant fluid coupling arrangement whereby the female coupling half includes a tubular body shutoff upon which a male body and seal sit. See, FIG. 5 labeled "prior art" herein which is substantially similar to FIG. 3 of the '141 patent illustrating the male body 40 and seal 17" residing adjacent and in engagement with the tubular body shutoff 7 of the female coupling half 2. FIG. 5 is a cross-sectional view 500 of a prior art female coupling half 2 and male coupling half 3 coupled. Reference numeral 4 indicates a hole or passageway for the communication of fluid therethrough. Reference numerals 18/19 signify a valve in the male coupling half 3 of the prior art as illustrated in FIG. 5.

Still referring to FIG. 5 herein, it will be noticed that the tubular body shutoff 7 includes an external stop (unnumbered) located longitudinally in the approximate middle thereof and it is this external stop which engages two springs identified with reference numerals 8 and 10 in FIG. 1 of the '141 patent. Reference numeral 8 is not shown in FIG. 5 herein. Spring 8 operates and acts between a fixed body and the external stop of the tubular body shutoff urging it longitudinally outwardly to shutoff against valve or bolt 5. Spring 10 operates and acts between the external stop and an annular sleeve 9 urging the sleeve longitudinally outwardly to create a flush face along with the flush face of the bolt or valve 5. Action of these two springs has the effect of floating the tubular body shutoff as spring 10 tends to urge the tubular body shutoff away from its closed position while spring 8 tends to urge the tubular body shutoff toward its closed position. Floating of the tubular body shutoff is not desirable because it promotes incomplete closure of the tubular body shutoff against the valve or bolt 5. If the tubular shutoff body 7 of the '141 patent does not move fully outwardly due to swelling of the seals in the device or because of tight tolerances between the parts and uneven expansion thereof, then the tubular shutoff body fails to close thus creating a leak from the female coupling half.

FIG. 4 is a quarter-sectional view 400 of a prior art female coupling half. FIG. 4A is a quarter-sectional view 400A of a prior art male coupling half. FIG. 4B is a quarter-sectional view 400B of a prior art female coupling half and male coupling half coupled. Referring to FIG. 4, a prior art coupling believed to be a product of Faster, SPA, of Italy is illustrated. It will be noted that reference numeral 490 indicates threads on the interior surface of the outer body thereof and the threads are located on both longitudinal sides of the unnumbered detents. This causes reciprocal threads 491 on the male coupling half as illustrated in FIG. 4A to traverse the unnumbered set of detents. Referring to FIGS. 4, 4A and 4B, reference numeral 407 refers to a tubular body shutoff which as stated above in connection with FIG. 5 is prone to hanging up (i.e., not going completely closed) due to the swelling of seal 451 and is not be expelled far enough toward the open end of the coupling half as designated generally by reference numeral 443 which is the flat face of valve or bolt 405. Spring 460 urges the tubular shutoff toward the open end. Spring 460A contributes to urging sleeve 409 toward the open end of the coupling but since sleeve 409 and tubular support 451 are not interlocked, spring 460A does not contribute to insuring that tubular shutoff 407 does in fact shut off.

Still referring to FIGS. 4, 4A, and 4B, reference numeral 414 represents a closed wall of a tubular bolt which is positioned by spring 422. Reference numeral 417 represents a seal which engages the tubular bolt of the male and the tubular body shutoff 407 when the device is coupled. Reference numeral 440 is a bolt body and reference numeral 419 is a shutoff surface and reference numeral 430 is seal. It will be noticed when reference is made to FIG. 4B that spring 460 urges tubular body shutoff 407 toward its closed position as illustrated in FIG. 4. However, the design of the prior art device does not include an interlock of the tubular body shutoff with the male coupling half to insure its closure.

Therefore, it is desirable to avoid leaks upon disconnection of a coupling by ensuring that valve in the female half of the coupling are interlocked with the male coupling half during disconnection of the coupling halves.

SUMMARY OF THE INVENTION

A coupling is disclosed which includes a female coupling half and a male coupling half is disclosed. The male coupling half includes a male body having an exterior with a recess therein which extends circumferentially around the exterior of the male coupling half. The female coupling half includes a valve, a female body, and a female body extension affixed to the female body. The female valve is sometimes referred to herein as a pintle. The valve (pintle) is affixed by threading it to the female body. A sliding sleeve is movable with respect to the female body, the female body extension and the valve. The sliding sleeve is movable between a first position abutting the valve and closing the valve, and, a second position not abutting the valve thus opening the valve.

The male body of the male coupling half interengages the sliding sleeve of the female coupling half during engagement therewith moving the sliding sleeve from the first closed position to the second open position.

The sliding sleeve of the female coupling half includes a first set of detents carried therewith which interengage the circumferentially extending recess in the exterior of the male body during coupling of the coupling halves. The first set of detents are released from interengagement with the circumferentially extending recess in the exterior of the male body of the male coupling half during uncoupling of the halves from each other after the sliding sleeve is moved to the first position abutting the valve of the female coupling half.

The female body extension of the female coupling half includes a second set of detents therein. The sliding sleeve of the female coupling half includes an exterior having a circumferentially extending recess therein and the second set of detents interengage the recess in the exterior of the sliding sleeve during coupling of the coupling halves.

The female body extension includes an inner surface and an outer surface and the inner surface interengages and locks the first set of detents interengaging the recess in the male body of the male coupling half during coupling. The female coupling half includes a locking ring having an inner surface and an outer surface. The locking ring resides radially outwardly of the female body extension of the female coupling half. The inner surface of the locking ring is in sliding engagement with the female body extension of the female coupling half during coupling and locks and interengages the second set of detents interengaging the recess in the exterior surface of the sliding sleeve valve of the female coupling half.

The female coupling half includes an outer sleeve having an inner surface and an outer surface. The inner surface of the outer sleeve includes a shoulder thereon and, during uncoupling, the shoulder engages the locking ring moving the locking ring releasing the second set of detents from the recess in the exterior surface of the sliding sleeve which in turn releases the sliding sleeve enabling movement of the sliding sleeve to the first closed position abutting the valve (pintle) and releasing the first set of detents of the female coupling half.

The female body extension includes a recess in the inner surface thereof. The first set of detents carried with the sliding sleeve is released when positioned adjacent the recess in the inner surface of the female body extension.

The female coupling half includes a first spring operable between the body and the sliding sleeve urging the sliding sleeve longitudinally outwardly. The female coupling half includes a second spring operable between the body and the locking ring urging the locking ring longitudinally outwardly locking the second set of detents in the exterior recess of the sliding sleeve.

Alternatively, in another example, the second spring operates between a snap ring and the locking ring. The snap ring is mounted in a circumferential groove in the exterior surface for the female body extension.

In one example, the valve/pintle of the female coupling half includes a passageway for breaking vacuum between the sliding sleeve and the body of the female coupling half. Another example does not include a passageway for breaking vacuum.

The male and female coupling halves each include a surface having threads thereon for interconnecting the coupling halves. The threaded surfaces do not traverse the first set or second set of detents during coupling and uncoupling.

When the coupling is disconnected, the outer sleeve of the female coupling half is urged outwardly to protect the external acme threads on the female body extension. Threads other than ACME threads may be used. A cover protects the third spring operable between the cover/body of the female coupling half and the outer sleeve.

As the male coupling half (nipple) engages the female coupling half (coupler), the locking sleeve of the male coupling half with internal threads thereon is rotated to thread onto the external threads on the body extension of the female coupling half. As the threads interengage, the outer sleeve of the female coupling half is forced back against the force of the third spring allowing connection of the coupling halves. As the male body extension of the male coupling half is urged into the body extension of the female coupling half, the first set of detents is urged radially inwardly into the ball race or external recess of the male body extension locking the sliding sleeve of the female coupling half to the male body of the male coupling half. This locks the sliding sleeve of the female coupling half to the male body of the male coupling half when in all positions other than the disconnected position with the valves of the male and female coupling halves closed.

When fully connected or coupled, the second set of detents is urged radially inwardly by the spring biased locking ring into engagement with a second ball race or recess extending circumferentially about the exterior of the sliding sleeve. The locking ring secures the sliding sleeve in the connected or coupled position. If the locking sleeve of the male coupling half is attempted to be rotated under the influence of a person's hand to disconnect (or under the influence of mechanical vibration), the sliding sleeve (which is locked to the male body) prevents any axial movement and prevents disconnection (uncoupling) of the coupling halves. Only when the outer sleeve of the female coupling half is urged against the force of the third spring and engages a shoulder on the locking ring and thus axially moves the locking ring will the second set of detents release the sliding sleeve to travel or move axially toward the first, closed position. While this is occurring the first set of detents remain locked to the male coupling half until the sliding sleeve is moved axially to the first, closed position where the first set of balls are free to move radially outwardly into a recess in the female body extension of the female coupling halves.

Alternatively the locking ring could be operated directly if the outer sleeve is not used.

In another example, the female coupling half includes an insert which is threaded to the sliding sleeve for the purpose of trapping the seal between the sliding sleeve and the valve. A sealant is used to ensure securement of the insert to the sliding sleeve. Additionally the second example employs a snap ring which resides in a groove in the exterior of the female body extension. The second spring is operable between the snap ring and the locking ring. The second example further employs a coarse threads on the female body extension and on the locking sleeve of the male coupling half. The second example of the invention further includes an insert and a sliding sleeve having surfaces to trap a seal therebetween for sealing between the valve and the sliding sleeve. Additionally the male end cap includes a lip or flared end for retaining a seal between the valve and the male body extension.

Accordingly, it is an object of the invention to provide a thread to connect coupling with positive flow shutoff upon disconnection.

Accordingly, it is an object of the invention to provide a thread to connect coupling which cannot be disengaged by vibration or manually unthreaded without first retracting the outer safety sleeve on the female coupling half.

Accordingly, it is an object of the invention to provide a thread to connect coupling with positive flow shutoff upon disconnection which is threaded together without traversing a set of detents with a threaded surface.

These and other objects will be understood when reference is made to the Brief Description of the Drawings, Description of the Invention and Claims which follow hereinbelow.

BRIEF DESCRIPTION OF THE DRAWINGS

FIG. 4 is a quarter-sectional view of a prior art female coupling half.

FIG. 4A is a quarter-sectional view of a prior art male coupling half

FIG. 4B is a quarter-sectional view of a prior art female coupling half and male coupling half coupled.

Figure 1:
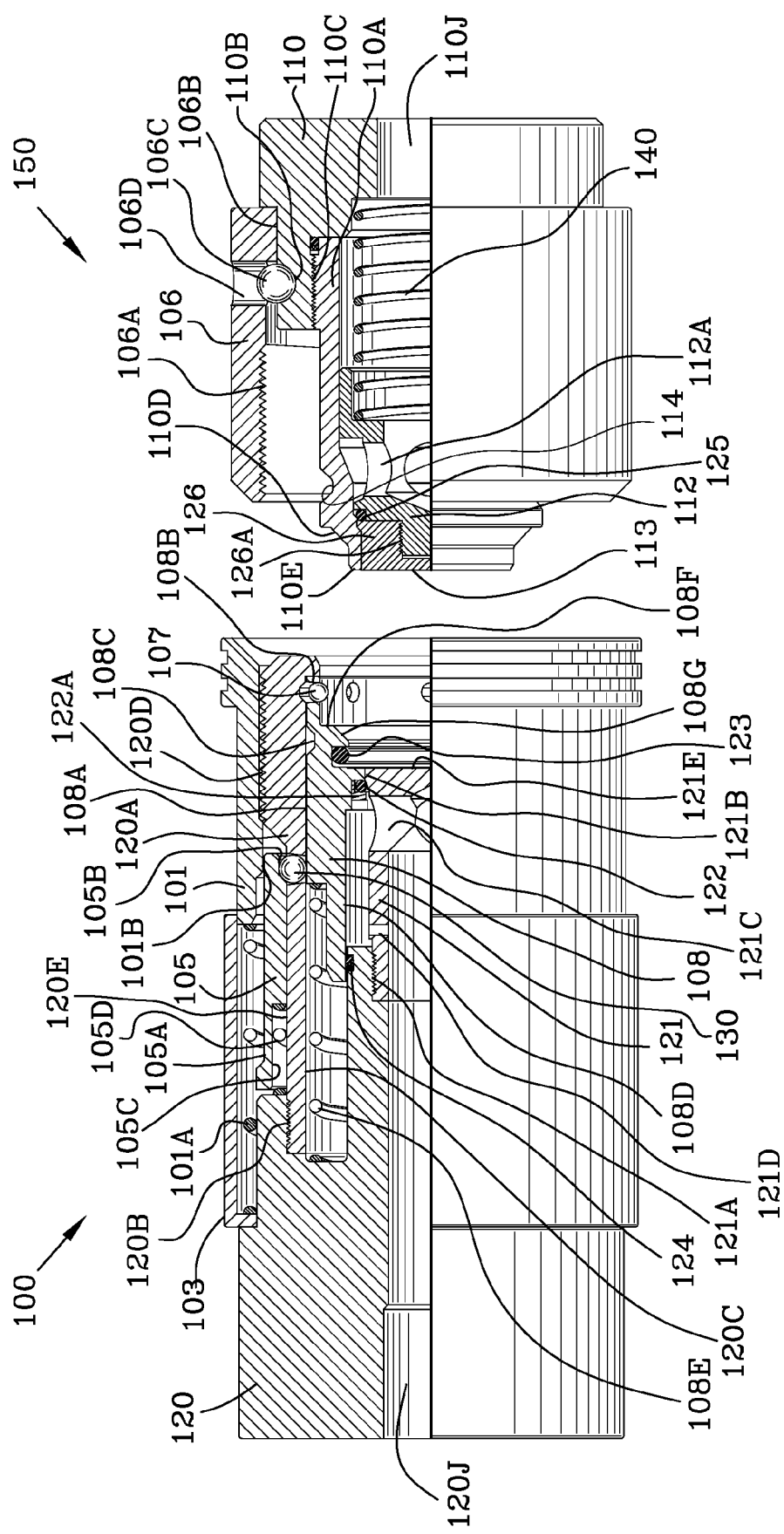
FIG. 1 is a quarter-sectional view of the female coupling half and the male coupling half uncoupled.

A better understanding of the drawing figures will be had when reference is made to the Description of the Invention and Claims which follow hereinbelow.

DESCRIPTION OF THE INVENTION

Figure 1A:
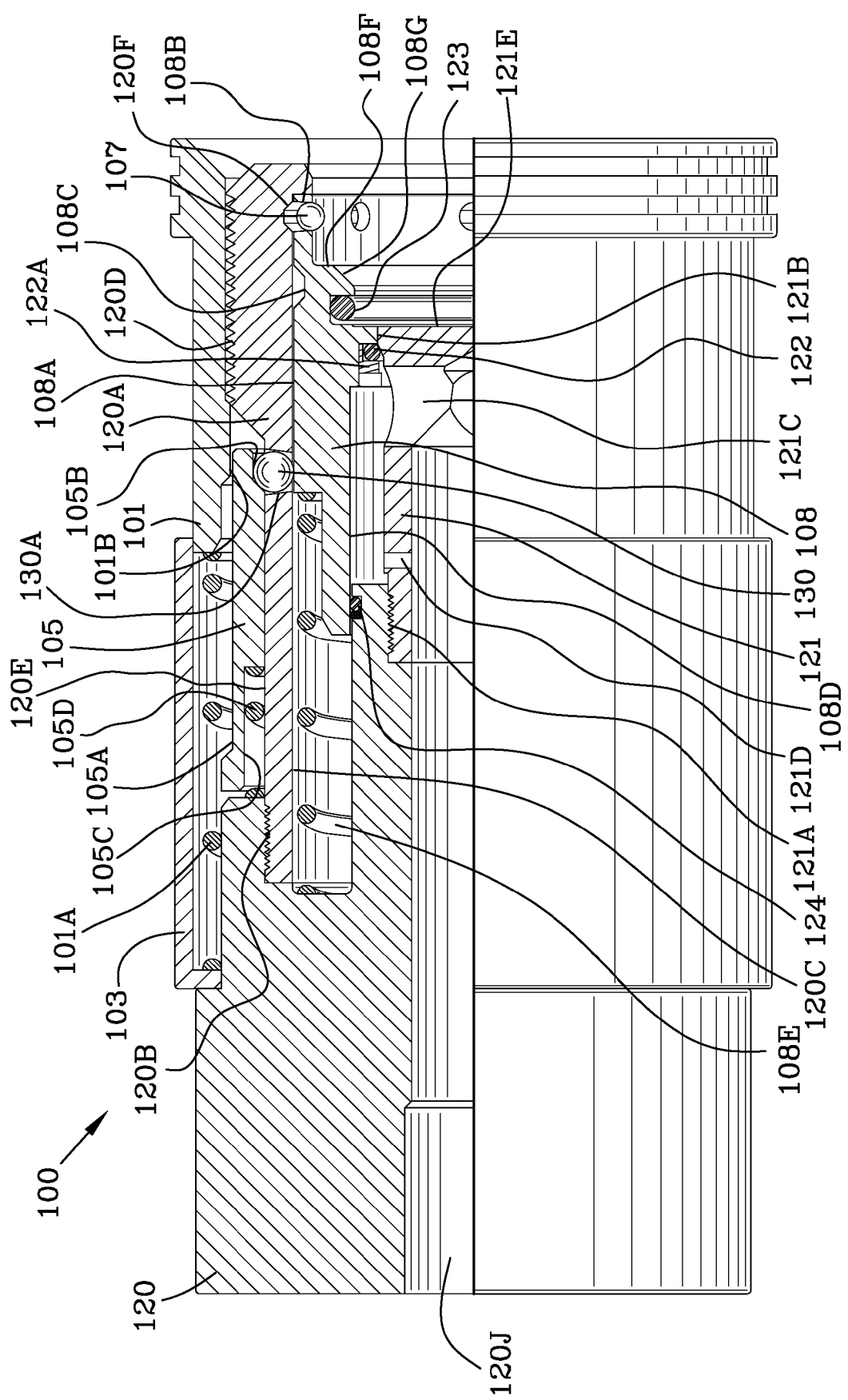
FIG. 1A is an enlarged quarter-sectional view of the female coupling half of FIG. 1.

FIG. 1 is a quarter-sectional view of the female coupling half 100 and the male coupling half 150 uncoupled. FIG. 1A is an enlarged quarter-sectional view 100 of the female coupling half of FIG. 1. And, FIG. 1B is an enlarged quarter-sectional view 150 of the male coupling half of FIG. 1.

Figure 1B:
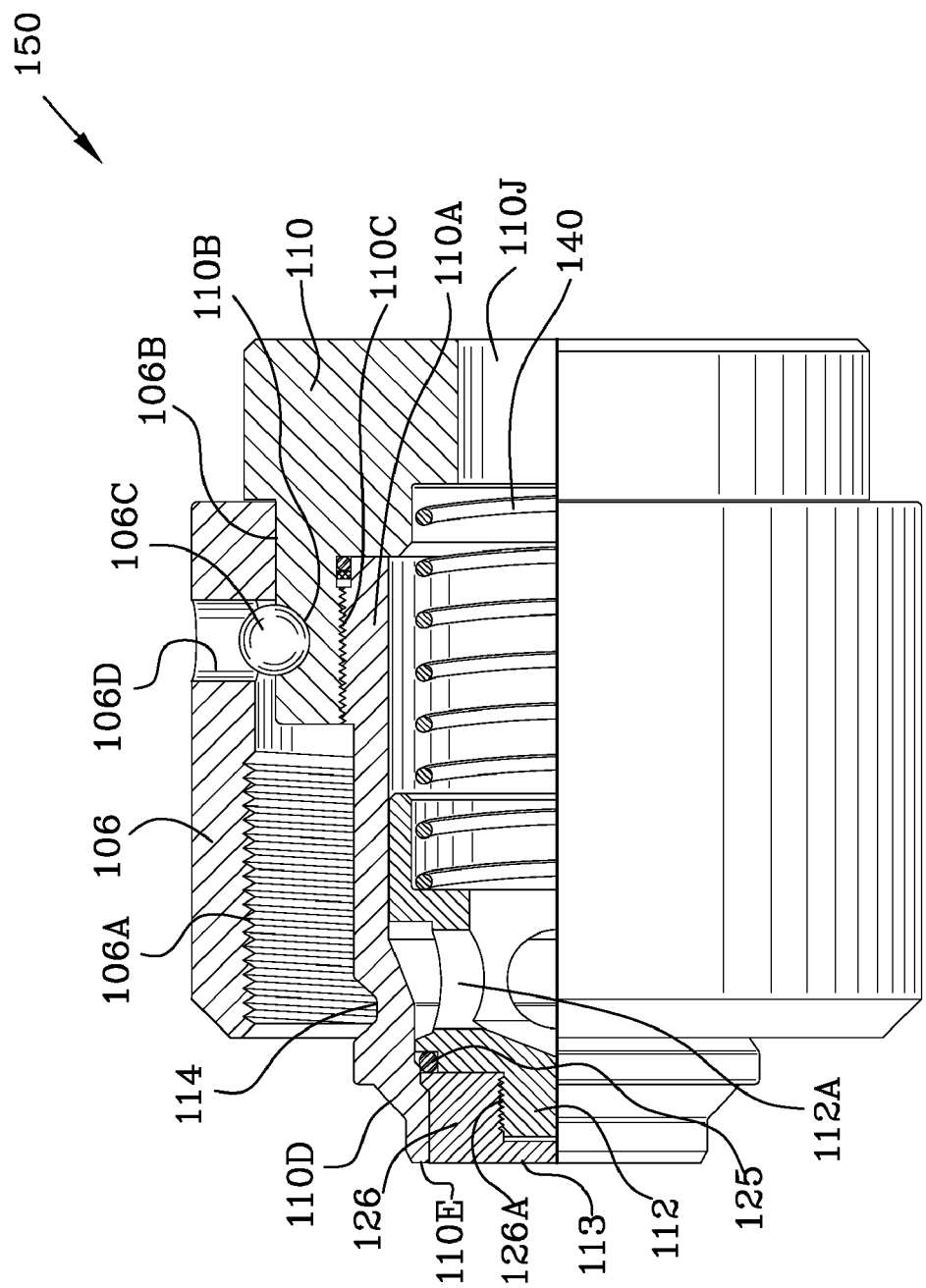
FIG. 1B is an enlarged quarter-sectional view of the male coupling half of FIG. 1.

Referring to FIGS. 1, 1A and 1B, female coupling half 100 includes a body 120 and a body extension 120A threaded 120B thereto. Body extension 120A is essentially concentric with respect to body 120. A passageway 120J is centrally located in body 120. The materials of the body 120 and other structural parts can be any material capable of handling hydraulic fluid at high pressure such as, for instance, stainless steel. The seals used herein may be any suitable elastomeric material used in high pressure hydraulic fluid applications. Body extension 120A includes an inner surface 120C and an outer surface 120E. A portion of the outer surface of the body extension 120A includes threads 120D. The threads are preferably ACME threads. Threads 120D interengage threads 106A of the locking sleeve 106 of the male half of the coupling 150 as is described herein elsewhere with more detail.

Figure 2:
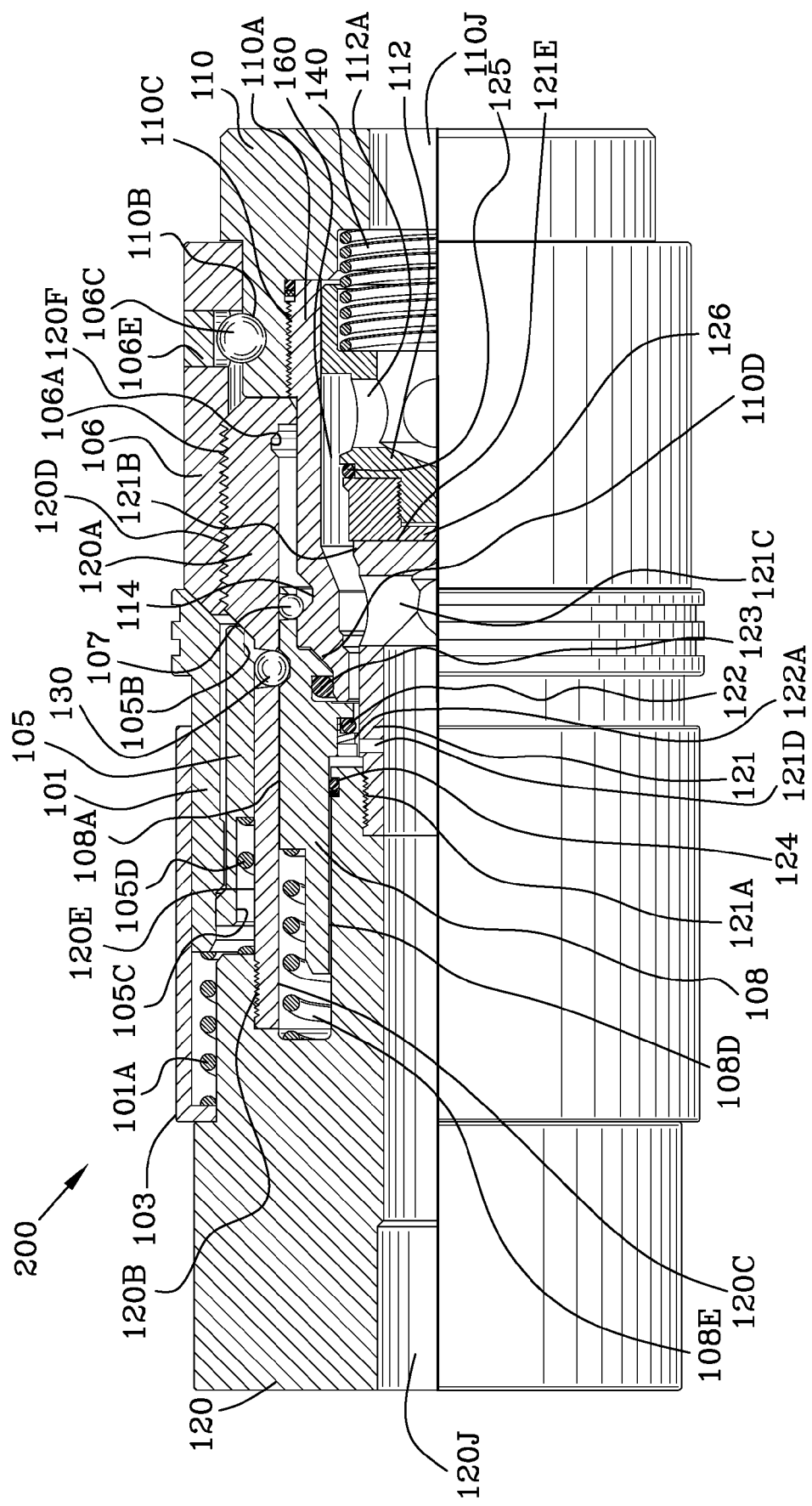
FIG. 2 is an enlarged quarter-sectional view of the female coupling half and the male coupling half coupled.

Referring still to FIGS. 1, 1A and 1B, a pintle or valve 121 is threaded 121A to female body 120. Valve 121 includes a generally flat face 121E which is open in FIG. 1 and engages corresponding flat face 113 of the male coupling half 150. Male coupling half includes a cap 126 which is threaded 126A to valve 112. Valve 112 includes radially extending ports or apertures 112A for communicating with the female half of the coupling as illustrated in FIG. 2. Seal 125 is an elastomeric seal and is trapped between end cap 126 and valve 112 to prevent extrusion or blowout of the seal.

Pintle or valve 121 includes an end portion 121B which is sealed 122 so as to prevent the escape of hydraulic fluid between the interface of the valve 121 and the sliding sleeve 108. Radially extending passageways 121C in valve 121 communicate fluid to the male coupling half as illustrated in FIG. 2 in the coupled condition. Radially extending passageway 121D in valve 121 is a vacuum break which facilitates closure of the sliding sleeve 108 to ensure that seal 122 carried by the sliding sleeve engages valve 121 as indicated by reference numeral 121B. Seal 124, an elastomeric seal, prevents the escape of hydraulic fluid in a path between the female body 120 and the inner surface 108D of the sliding sleeve 108.

Still referring to FIGS. 1, 1A and 1B, sliding sleeve 108 carries a first set of radially movable detents 107 in apertures 108B. Sliding sleeve 108 includes an exterior surface 108A and a circumferentially extending recess or ball race 108C therein. Ball race 108C interengages a second set of detents 130 carried by the body extension 120A. Both the first 107 set of radially movable detents and the second set 130 of radially movable detents are used to reliably secure the coupling halves together. First 107 set of radially movable detents interengage ball race or recess 114 in the exterior of the male body extension 110A of the male coupling half 150 as best viewed in FIG. 2.

Referring again to the sliding sleeve 108 as illustrated in FIGS. 1 and 1A, elastomeric seal 123 is carried in an unnumbered recess or groove and functions to seal surfaces 110E, 110D when the male coupling half is threaded 106A, 120D into the female half of the coupling. See, FIG. 2 illustrating the coupled condition. First spring 108E is operable between female body 120 and an unnumbered shoulder of sliding sleeve 108 and urges the sliding sleeve toward the first, closed position illustrated in FIGS. 1 and 1A. Sliding sleeve 108 is movable between a first, closed position as shown in FIG. 1A to a second, open position as shown in FIG. 2. Referring to FIGS. 1 and 1A and sliding sleeve 108, the leading end includes surfaces 108F and 108G for interengagement with corresponding surfaces generally denoted with reference numerals 110D, 110E in connection with male body extension 110A. Male body extension 110A is threaded 110C to male body 110.

Still referring to FIGS. 1 and 1A, locking ring 105 resides exteriorly to said female body extension 120A and is urged axially outwardly by spring 105D which operates between an unnumbered surface on female body 120 and an unnumbered internal shoulder surface of locking ring 105. Locking ring 105 includes an inner surface 105C and an outer surface 105A. A portion of the outer surface 105A of the locking ring includes a shoulder thereon for engagement with a corresponding internal shoulder on an internal surface 101B of the outer retractable sleeve 101. Reference numeral 105B indicates a recess in the locking ring allowing the second set of detents to be pushed radially outwardly by the sliding sleeve in the first, closed position as indicated in FIG. 1 (disconnected/uncoupled condition).

Still referring to FIGS. 1 and 1A, outer sleeve 101 covers and protects threads 120D on the female body extension 120A. Outer sleeve 101 is retractable for uncoupling against the force of spring 101A which operates between a cover 103 interposed between body 120 and the end of the outer sleeve 101. Cover 103 protects the internal components of the female coupling half against the unwanted intrusion of dirt and debris.

Referring to FIGS. 1 and 1B locking sleeve 106 is rotatably affixed to the male body 110 by detents or balls 106C residing in ball race or recess 110B. An aperture 106D provides a path for insertion of the balls 106C. Reference numeral 106B indicates the interface between the rotatable locking sleeve 106 and the male body 110. Reference numeral 110J indicates a flow passageway for the communication of hydraulic fluid. In the coupled condition as illustrated in FIG. 2, reference numeral 160 indicates the passageway which interconnects the radially extending ports 112A and 121C. Spring 140 operates between male body 110 and the valve 112 which prohibits the flow as shown in the disconnected state (FIG. 1).

FIG. 2 is a quarter-sectional view 200 of the female coupling half 100 and the male coupling half 150 coupled. Reference numeral 106E illustrates a plug for the pathway 106D for the insertion of the balls. Reference numeral 120F indicates a recess in the female body extension 120A which provides room for detents 107 to escape when the male body 106 is being extracted from the female coupling half. Some liberty was taken in the illustration of FIGS. 1 and 1A to the extent that the detent labeled 107 and shown therein would be slightly lower due to the force of gravity. Detents under the force of gravity would in fact be recessed and reside in their apertures 108B.

Still referring to FIG. 2, first spring 108E and third spring 101A are compressed and second spring 105D is extended. The first set of detents 107 engage circumferentially extending recess 114 of the male body extension 110A locking the sliding sleeve 108 and the male body extension 110A together. The second set of detents 130 which are larger than the first set of detents engage circumferentially extending recess 108C. Recess 108C is best illustrated in FIG. 3 with the second set 130 of detents released because of the external movement of the outer sleeve 101 by a person's hand or tool against the force of spring 101A and because of some unthreading of the coupling halves.

Still referring to FIG. 2, sliding sleeve 108 is illustrated in the second, open position under the influence of the male body extension 110A forcing the sliding sleeve leftwardly against the forceful resistance of spring 108E. In the coupled condition as illustrated in FIG. 2, the threads 106A on locking sleeve 106 fully receive the corresponding threads 120D of the female body extension 120A. As threads 106A of the locking sleeve of the male are threaded onto threads 120D of the female body, outer sleeve 101 is urged against spring 101A and the male body extension forces the sliding sleeve 108 against the force of spring 108E first engaging the first set of detents 107 followed by the engagement of the second set 130 of detents with the sliding sleeve. Second set of detents 130 are forced radially inwardly during coupling by the force of spring 105D which acts against the female body and the locking ring 105 which forces the locking ring 105 over the second set of detents 130 and pushes them radially inwardly into ball race or recess 108C of the sliding sleeve.

As the male coupling half is threaded onto and into the female coupling half, the flat face 113 of the end cap 126 engages pintle (valve) 121E and urges the male valve 112 open against the force of the spring 140 thus completing a flow path defined by reference numerals 120J, 121C, 160, 112A and 110J.

Figure 3:
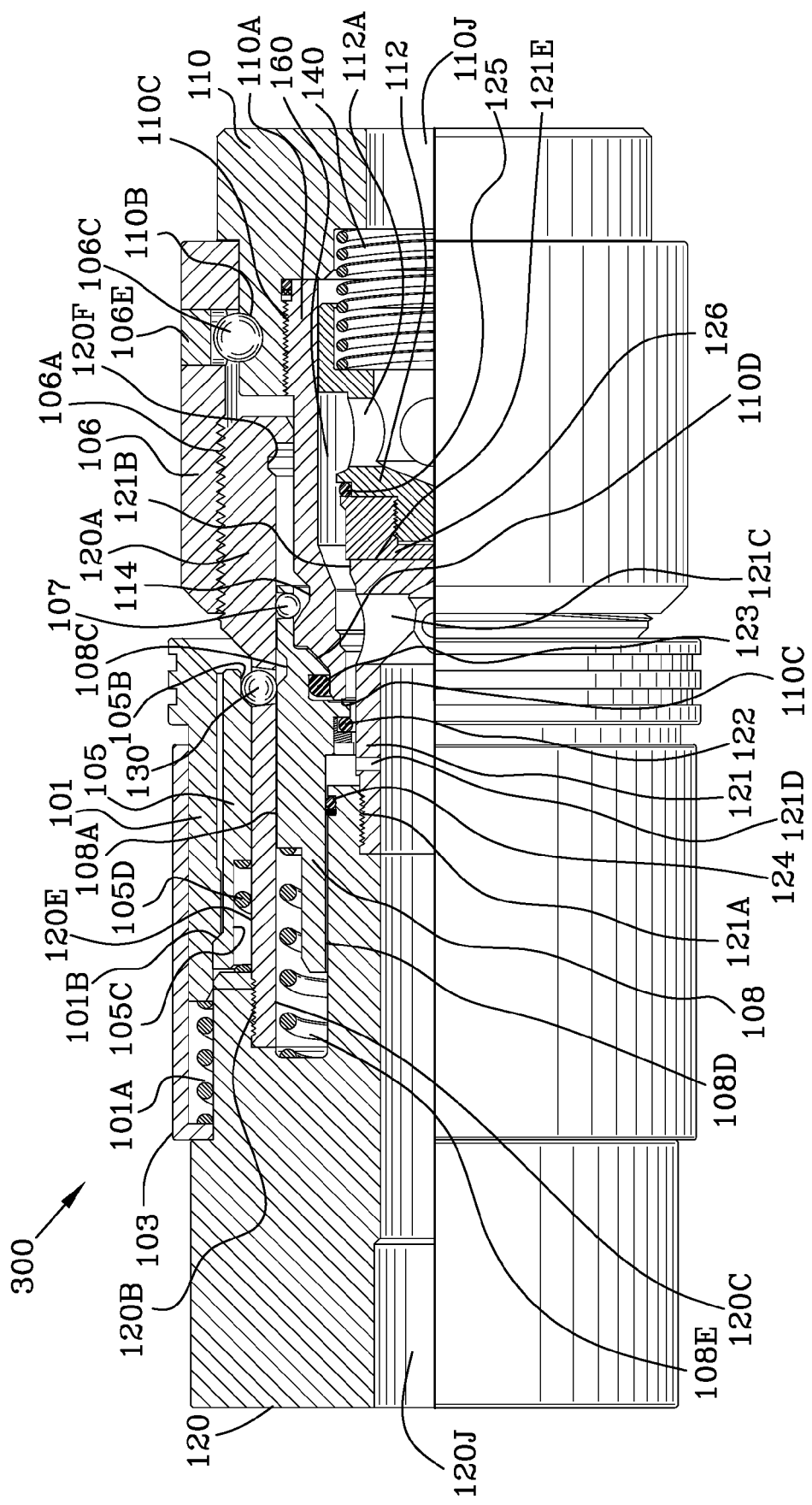
FIG. 3 is an enlarged quarter-sectional view of the female coupling half and the male coupling half in the process of being uncoupled.
Figure 5:
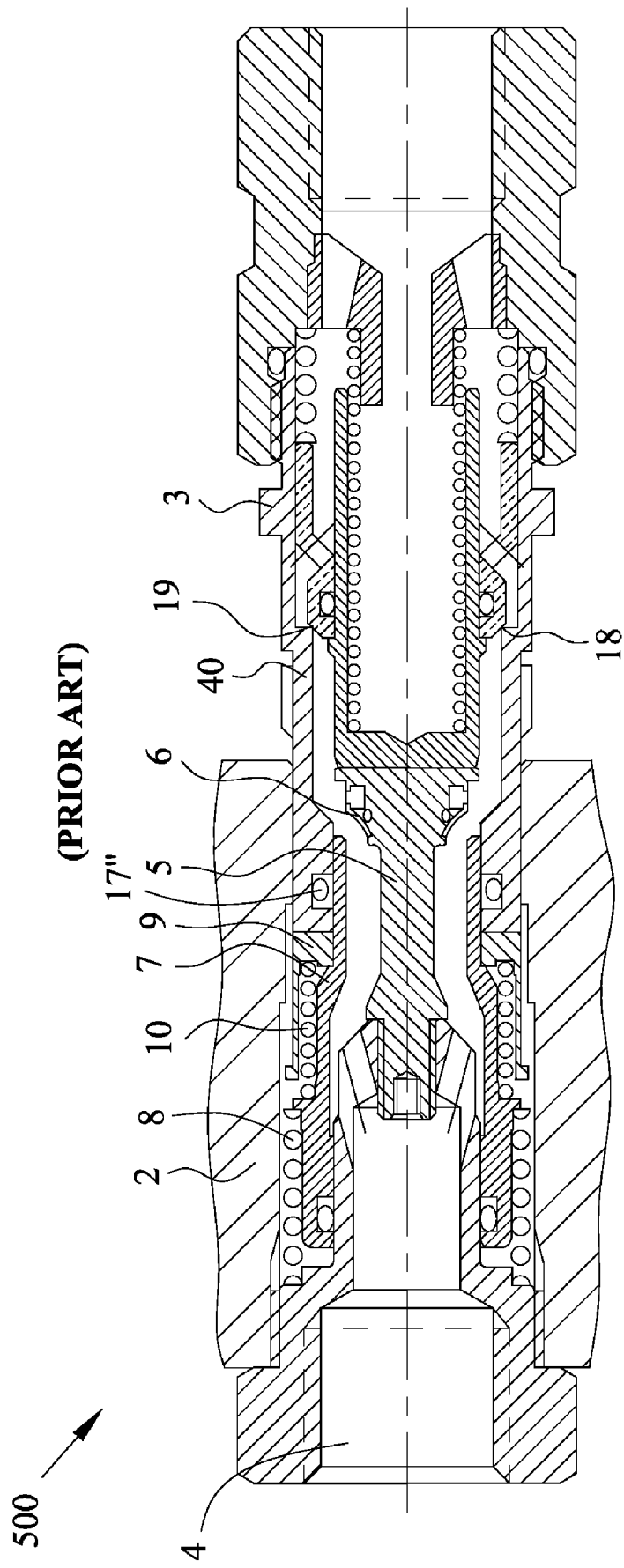
FIG. 5 is a cross-sectional view of a prior art female coupling half and male coupling half coupled.

FIG. 3 is a quarter-sectional view 300 of the female coupling half and the male coupling half in the process of being uncoupled. Referring to FIG. 3, passageway 121D illustrates a vacuum break as the sliding sleeve 108 is extracted under the urging of the male body extension 110A. To uncouple the coupling as illustrated in FIG. 3, the outer sleeve 101 must be pulled leftwardly as shown such that the internal shoulder 101B engages and external shoulder 105A on the locking ring which moves the locking ring against the force of spring 105D allowing and positioning recess 105B above the second set of detents to be thrust radially outwardly of circumferential recess or race 108C under the influence of the tension caused by unthreading the coupling. Therefore, to uncouple the coupling the outer sleeve 101 must be retracted and simultaneously the threaded locking sleeve 106 must be unthreaded from the female body extension. It is not enough for vibration or intentional unthreading alone to separate the coupling halves.

As the male coupling half (nipple) 150 engages the female coupling half (coupler) 100, the locking sleeve 106 of the male coupling half 150 with internal threads 106A thereon is rotated to thread onto the external threads 120D on the body extension 120A of the female coupling half. As the threads interengage, the outer sleeve 101 of the female coupling half is forced back against the force of the third spring 101A allowing connection of the coupling halves. As the male body extension 110A of the male coupling half is urged into the female body extension 120A of the female coupling half, the first set of detents 107 is urged radially inwardly into the ball race 114 or external recess of the male body extension locking the sliding sleeve 108 of the female coupling half to the male body of the male coupling half. This locks the sliding sleeve 108 of the female coupling half to the male body of the male coupling half in all positions other than the disconnected position with the valves 121, 112 of the male and female coupling halves closed.

When fully connected or coupled, the second set of detents 130 is urged radially inwardly by the spring biased 105D locking ring 105 into engagement with a second ball race 108C or recess extending circumferentially about the exterior of the sliding sleeve 108. The locking ring 105 secures the sliding sleeve 108 in the connected or coupled position. If the locking sleeve 106 of the male coupling half is attempted to be rotated under the influence of a person's hand to disconnect (or under the influence of mechanical vibration), the sliding sleeve 108 (which is locked 107/114 to the male body) prevents any axial movement and prevents disconnection (uncoupling) of the coupling halves. Only when the outer sleeve 101 of the female coupling half is urged against the force of the third spring 101A and engages a shoulder 105A on the locking ring 105 and thus axially moves the locking ring 105 will the second set of detents 130 release the sliding sleeve to travel or move axially toward the first, closed position (FIG. 3). It is not necessary to hold the outer sleeve 101 in its retracted position permanently while uncoupling as the detents 130 move radially outwardly positioning the locking ring 105 in the position illustrated in FIG. 3. While this is occurring the first set 107 of detents remain locked 107/114 to the male coupling half until the sliding sleeve 108 is moved axially to the first, closed position where the first set of balls/detents 107 are free to move radially outwardly into a recess 120F in the female body extension of the female coupling halves.

Figure 6:
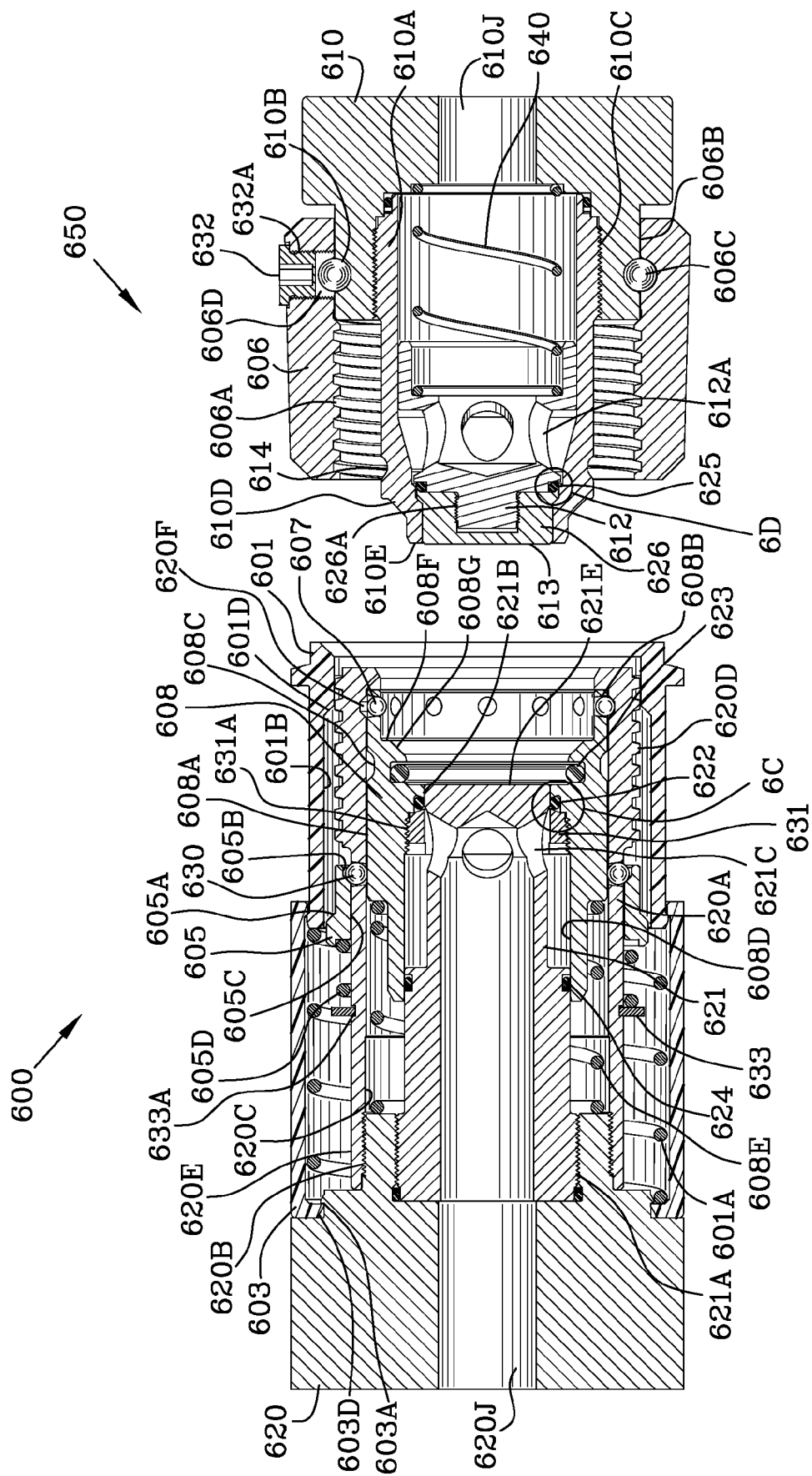
FIG. 6 is a cross-sectional view of another example of the female coupling half and the male coupling half uncoupled.
Figure 6A:
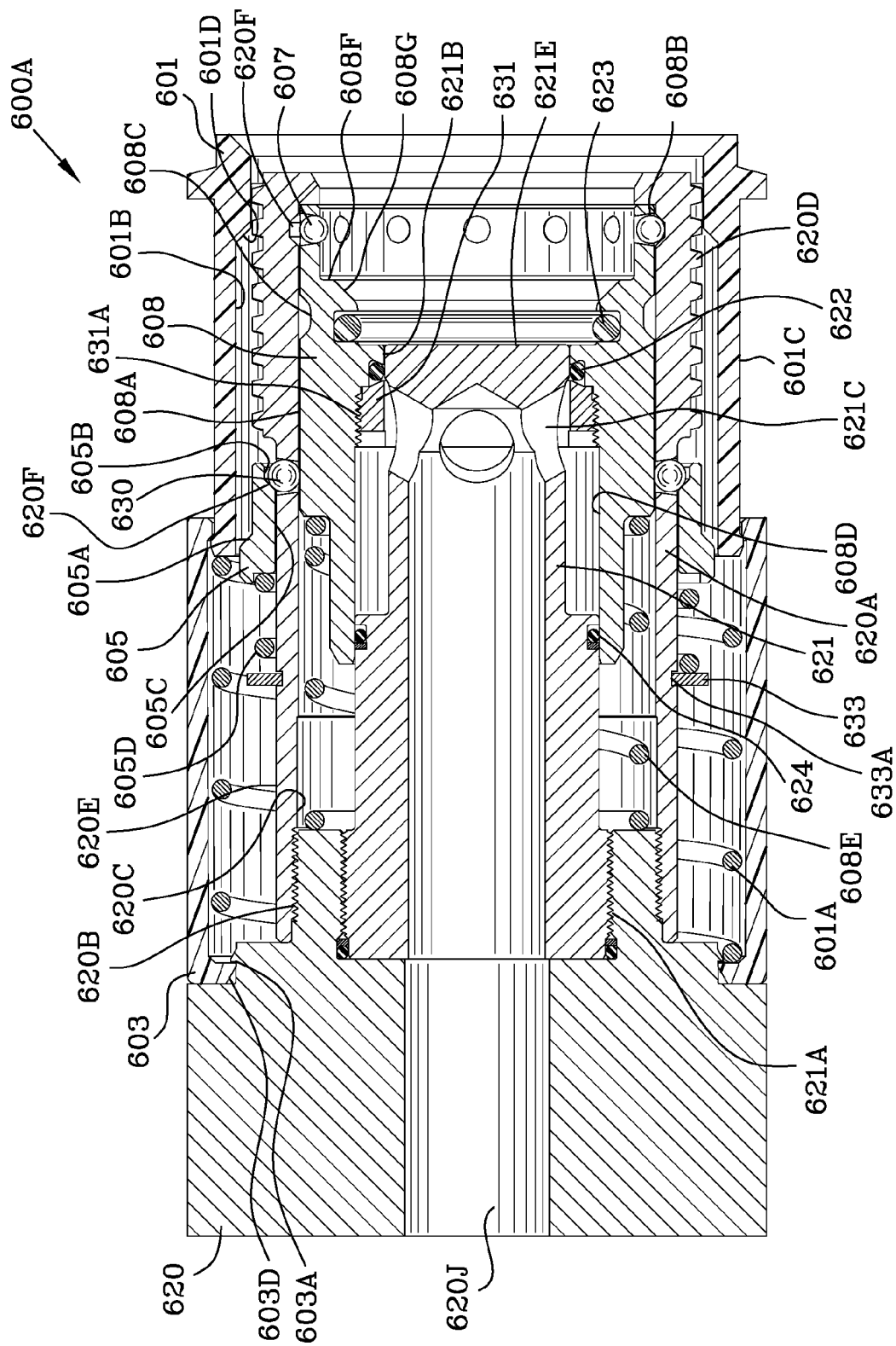
FIG. 6A is an enlarged cross-sectional view of the female coupling half of FIG. 6.
Figure 6B:
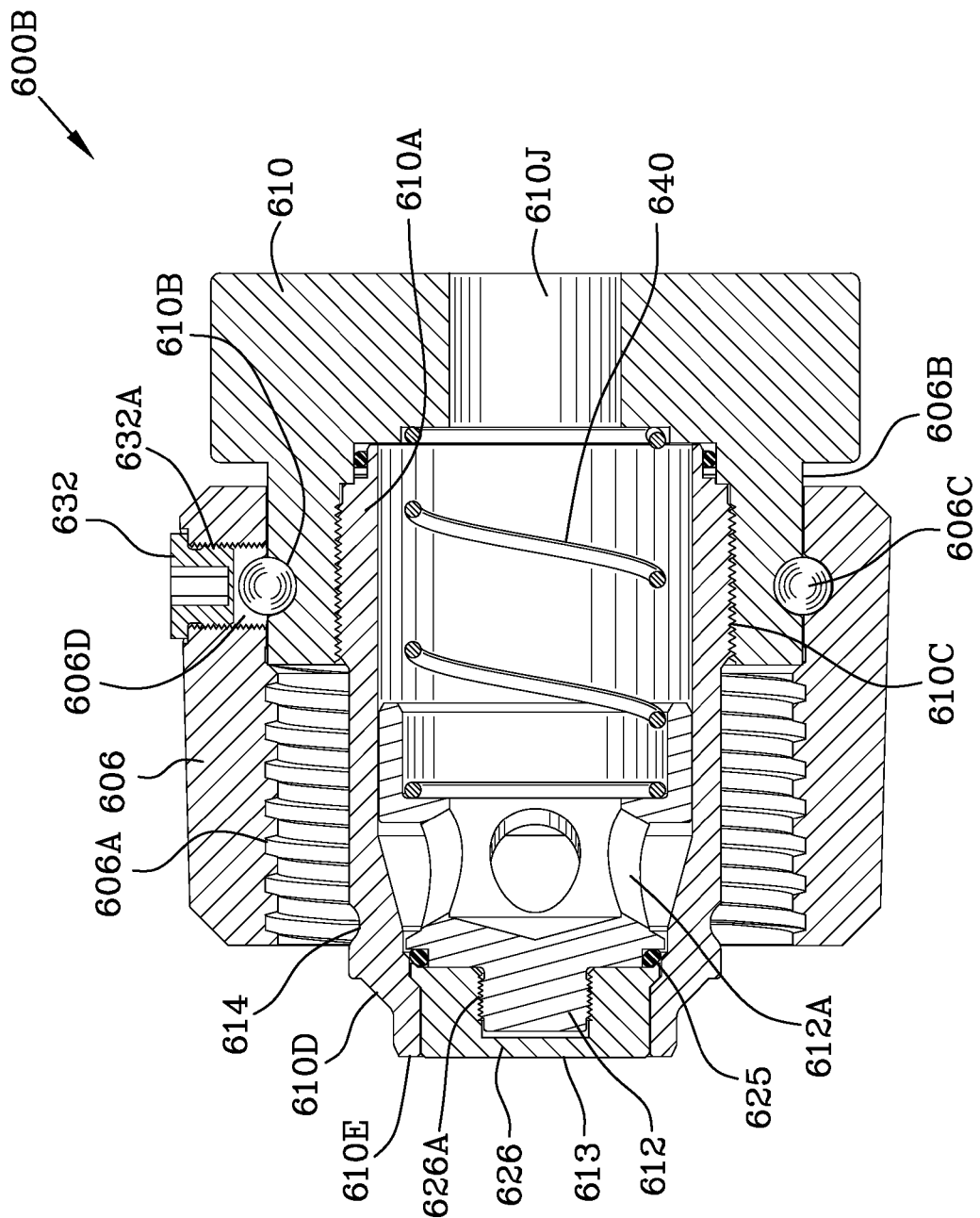
FIG. 6B is an enlarged cross-sectional view of the male coupling half of FIG. 6.
Figure 6D:
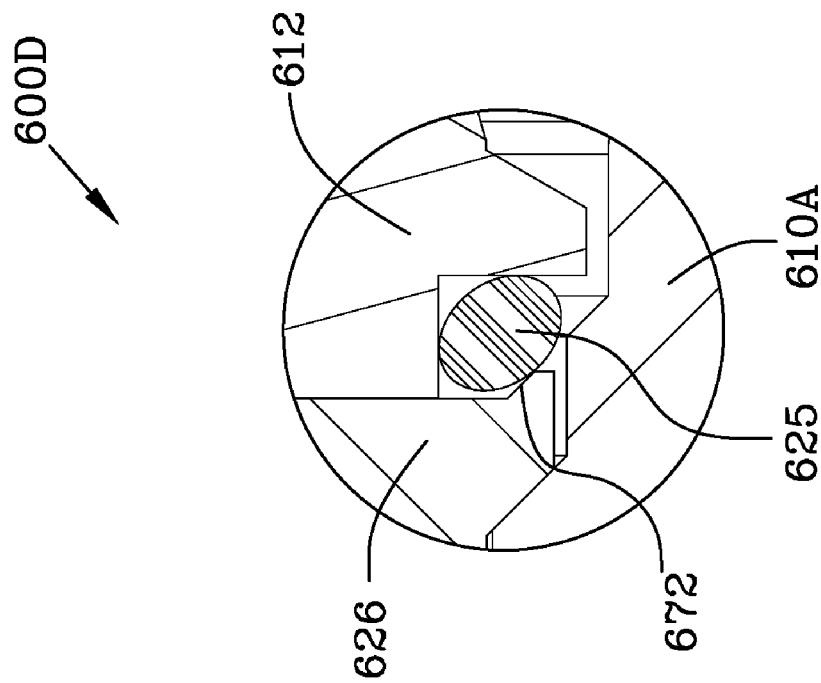
FIG. 6D is an enlarged portion of FIG. 6 illustrating a seal arrangement in the male coupling half.
Figure 6C:
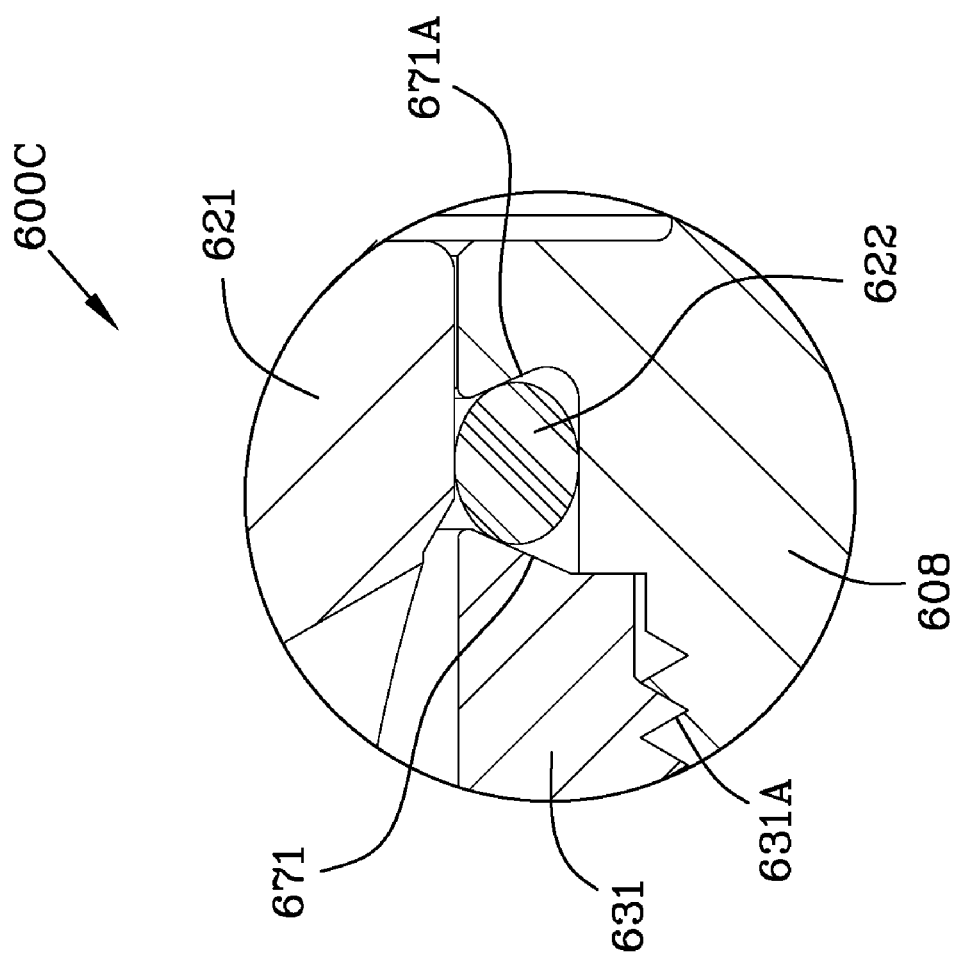
FIG. 6C is an enlarged portion of FIG. 6 illustrating a seal arrangement in the female coupling half.
Figure 7:
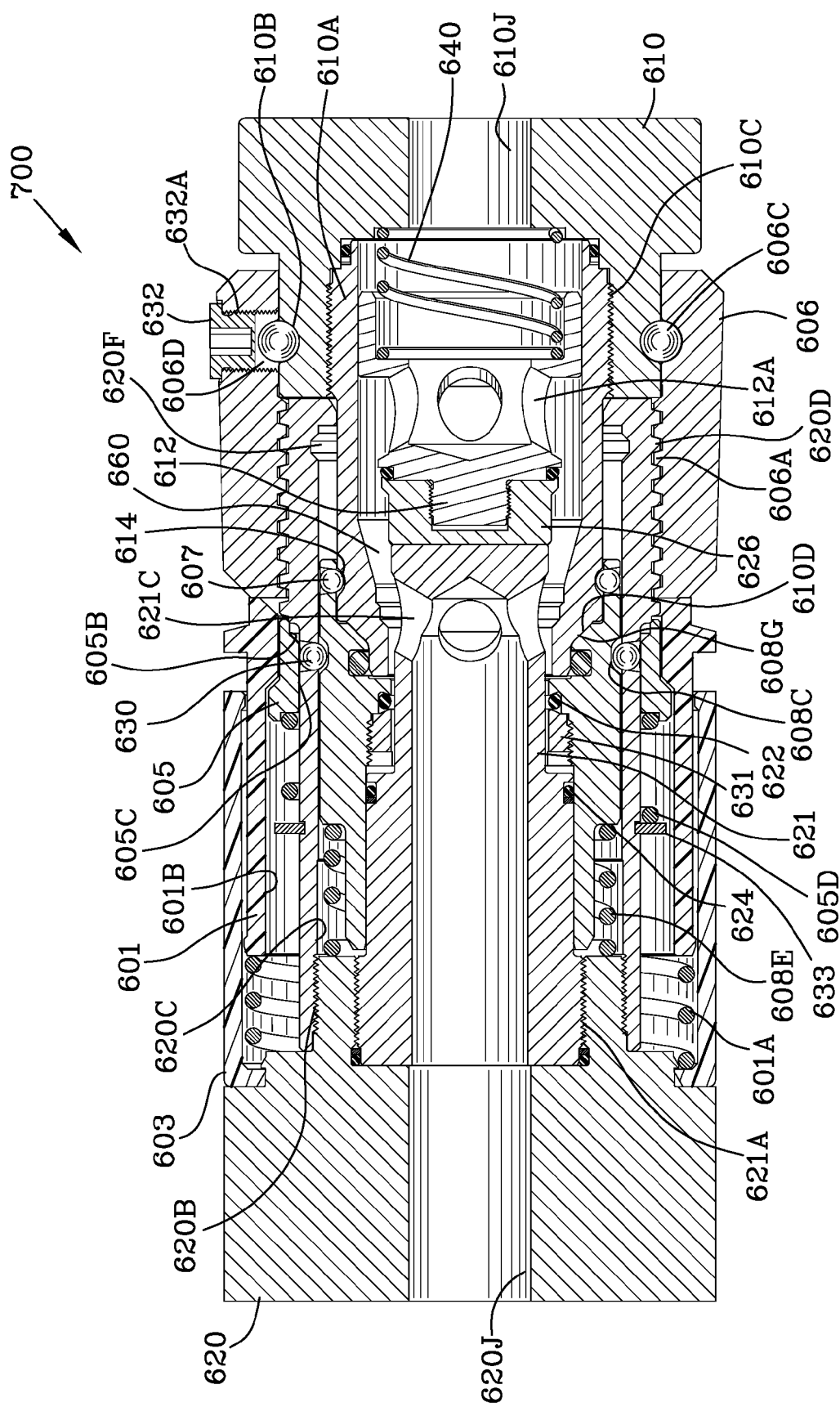
FIG. 7 is an enlarged cross-sectional view of the female coupling half and the male coupling half coupled.

FIG. 6 is a cross-sectional view of another example of the female coupling half 600 and the male coupling half 650 uncoupled. FIG. 6A is an enlarged cross-sectional view 600A of the female coupling half of FIG. 6. FIG. 6B is an enlarged cross-sectional view 600B of the male coupling half of FIG. 6. FIG. 7 is an enlarged cross-sectional view 700 of the female coupling half and the male coupling half coupled.

In the example of FIGS. 6, 6A, 6B, and 7, the female coupling half 600 includes an insert 631 which is threaded 631A to the sliding sleeve 608 for the purpose of trapping the seal 622 between the sliding sleeve 608 and the valve 621. The insert is broached so that it may be tightened. FIGS. 1 and 1A illustrate the broach as well for an unnumbered insert which retains seal 122. A sealant is used to ensure securement of the threads 631A of the insert to the sliding sleeve 608. Additionally the second example employs a snap ring 633 which resides in a groove 633A in the exterior of the female body extension 620A. The second spring 605D is operable between the snap ring 633 and the locking ring 605. The second example further employs coarse threads 620D, 606A on the female body extension 620A and on the locking sleeve 605 of the male coupling half.

FIG. 6 is a cross-sectional view of the female coupling half 600 and the male coupling half 650 uncoupled. FIG. 6A is an enlarged cross-sectional view 600 of the female coupling half of FIG. 6. And, FIG. 6B is an enlarged cross-sectional view 650 of the male coupling half of FIG. 6. Referring to FIGS. 6, 6A and 6B, female coupling half 600 includes a body 620 and a body extension 620A threaded 120B thereto. Body extension 620A is essentially concentric with respect to body 620.

A passageway 620J is centrally located in body 620. The materials of the body 620 and other structural parts can be any material capable of handling hydraulic fluid at high pressure such as, for instance, stainless steel. The seals used herein may be any suitable elastomeric material used in high pressure hydraulic fluid applications. Body extension 620A includes an inner surface 620C and an outer surface 620E. A portion of the outer surface of the body extension 620A includes threads 620D. The threads are preferably ACME threads but UN or other threads may be used. Threads 620D interengage threads 606A of the locking sleeve 606 of the male half of the coupling 650 as is described herein elsewhere with more detail.

Referring still to FIGS. 6, 6A and 6B, a pintle or valve 621 is threaded 621A to female body 620. It will be noticed that female body 620 does not have the vacuum break identified as passageway 121D. Insert 631 traps seal 622 eliminating any need for the vacuum break 121D. Valve 621 includes a generally flat face 621E which is open in FIG. 6 and engages corresponding flat face 613 of the male coupling half 650. Male coupling half includes a cap 626 which is threaded 626A to valve 612. Valve 612 includes radially extending ports or apertures 612A for communicating with the female half of the coupling as illustrated in FIG. 7. Seal 625 is an elastomeric seal and is trapped between end cap 626 and valve 612 to prevent extrusion or blowout of the seal.

Pintle or valve 621 includes an end portion 621B which is sealed 622 so as to prevent the escape of hydraulic fluid between the interface of the valve 621 and the sliding sleeve 608. Radially extending passageways 621C in valve 621 communicate fluid to the male coupling half as illustrated in FIG. 7 in the coupled condition. Seal 624, an elastomeric seal, prevents the escape of hydraulic fluid in a path between the female body 620 and the inner surface 608D of the sliding sleeve 608.

Still referring to FIGS. 6, 6A and 6B, sliding sleeve 608 carries a first set of radially movable detents 607 in apertures 608B. Sliding sleeve 608 includes an exterior surface 608A and a circumferentially extending recess or ball race 608C therein. Ball race 608C interengages a second set of detents 630 carried by the body extension 620A. Both the first 607 set of radially movable detents and the second set 630 of radially movable detents are used to reliably secure the coupling halves together. First 607 set of radially movable detents interengage ball race or recess 614 in the exterior of the male body extension 610A of the male coupling half 650 as best viewed in FIG. 7.

Referring again to the sliding sleeve 608 as illustrated in FIGS. 6 and 6A, elastomeric seal 623 is carried in an unnumbered recess or groove and functions to seal surfaces 610E, 610D when the male coupling half is threaded 606A, 620D into the female half of the coupling. See, FIG. 7 illustrating the coupled condition. First spring 608E is operable between female body 620 and an unnumbered shoulder of sliding sleeve 608 and urges the sliding sleeve toward the first, closed position illustrated in FIGS. 6 and 6A. Sliding sleeve 608 is movable between a first, closed position as shown in FIG. 6A to a second, open position as shown in FIG. 7. Referring to FIGS. 6 and 6A and sliding sleeve 608, the leading end includes surfaces 608F and 608G for interengagement with corresponding surfaces generally denoted with reference numerals 610D, 610E in connection with male body extension 610A. Male body extension 610A is threaded 610C to male body 610.

Still referring to FIGS. 6 and 6A, locking ring 605 resides exteriorly to said female body extension 620A and is urged axially outwardly by spring 605D which operates between snap ring 633 mounted in a circumferential groove 633A in female body extension 620A and an unnumbered internal shoulder surface of locking ring 605. Locking ring 605 includes an inner surface 605C and an outer surface 605A. A portion of the outer surface 605A of the locking ring includes a shoulder thereon for engagement with a corresponding internal shoulder 601D on an internal surface 601B of the outer retractable sleeve 601. Reference numeral 605B indicates a recess in the locking ring allowing the second set of detents to be pushed radially outwardly by the sliding sleeve in the first, closed position as indicated in FIG. 6 (disconnected/uncoupled condition).

Still referring to FIGS. 6 and 6A, outer sleeve 601 covers and protects threads 620D on the female body extension 620A. Outer sleeve 601 is retractable for uncoupling against the force of spring 601A which operates between a cover 603 interposed between body 620 and the end of the outer sleeve 601. Cover 603 is preferably plastic but may be metal if desired as long as sufficient flexibility is exhibited to fit over a small lip 603A of the female body such that the cover will sit in a slight recess 603D in the body. Cover 603 protects the internal components of the female coupling half against the unwanted intrusion of dirt and debris.

Referring to FIGS. 6 and 6B locking sleeve 606 is rotatably affixed to the male body 610 by detents or balls 606C residing in ball race or recess 610B. An aperture 606D provides a path for insertion of the balls 606C. Reference numeral 606B indicates the interface between the rotatable locking sleeve 606 and the male body 610. Reference numeral 610J indicates a flow passageway for the communication of hydraulic fluid. In the coupled condition as illustrated in FIG. 7, reference numeral 660 indicates the passageway which interconnects the radially extending ports 612A and 621C. Spring 640 operates between male body 610 and the valve 612 which prohibits the flow as shown in the disconnected state (FIG. 6).

FIG. 7 is a cross-sectional view 700 of the female coupling half 600 and the male coupling half 650 coupled. Reference numeral 632 illustrates a plug for the pathway 606D for the insertion of the balls. Reference numeral 620F indicates a recess in the female body extension 620A which provides room for detents 630 to escape when the male body 606 is being extracted from the female coupling half and reference numeral 620R indicates a recess in the female body extension 620A which provides room for detents 607 to escape when the male body 606 is being extracted from the female coupling half.

Still referring to FIG. 7, first spring 608E and third spring 601A are compressed and second spring 605D is extended. The first set of detents 607 engage circumferentially extending recess 614 of the male body extension 610A locking the sliding sleeve 608 and the male body extension 610A together. The second set of detents 630 which are larger than the first set of detents engage circumferentially extending recess 608C. Recess 608C is best illustrated in FIG. 6A.

Still referring to FIG. 7, sliding sleeve 608 is illustrated in the second, open position under the influence of the male body extension 610A forcing the sliding sleeve leftwardly against the forceful resistance of spring 608E. In the coupled condition as illustrated in FIG. 7, the threads 606A on locking sleeve 606 fully receive the corresponding threads 620D of the female body extension 620A. As threads 606A of the locking sleeve of the male are threaded onto threads 620D of the female body, outer sleeve 601 is urged against spring 601A and the male body extension forces the sliding sleeve 608 against the force of spring 608E first engaging the first set of detents 607 followed by the engagement of the second set 630 of detents with the sliding sleeve. Second set of detents 630 are forced radially inwardly during coupling by the force of spring 605D which acts against the snap ring 633 and the locking ring 605 which forces the locking ring 605 over the second set of detents 630 and pushes them radially inwardly into ball race or recess 608C of the sliding sleeve. As this happens the locking ring snaps against the outer retractable sleeve 601 and the female body extension 620A.

As the male coupling half is threaded onto and into the female coupling half, the flat face 613 of the end cap 626 engages pintle (valve) 621E and urges the male valve 612 open against the force of the spring 640 thus completing a flow path defined by reference numerals 620J, 621C, 660, 612A and 610J.

To uncouple the coupling as illustrated in FIG. 7, the outer sleeve 601 must be pulled leftwardly such that an internal shoulder on the inner surface 601B of the outer retractable sleeve engages an external shoulder 605A on the locking ring which moves the locking ring against the force of spring 605D allowing and positioning recess 605B above the second set of detents 630 to be thrust radially outwardly of circumferential recess or race 608C under the influence of spring 608E and the unthreading of the coupling. As the coupling is unthreaded sliding sleeve 608 is pulled outwardly be the engagement of the male body extension 610A with the sliding sleeve 608. Therefore, to uncouple the coupling the outer sleeve 601 must be retracted and simultaneously the threaded locking sleeve 606 must be unthreaded from the female body extension. It is not enough for vibration or intentional unthreading alone to separate the coupling halves because the locking ring 605 must first, as a permissive, be moved to unlock the second set of detents from the sliding sleeve 608 and the female body extension 620A.

As the male coupling half (nipple) 650 engages the female coupling half (coupler) 600, the locking sleeve 606 of the male coupling half 650 with internal threads 606A thereon is rotated to thread onto the external threads 620D on the body extension 620A of the female coupling half. As the threads interengage, the outer sleeve 601 of the female coupling half is forced back against the force of the third spring 601A allowing connection of the coupling halves. As the male body extension 610A of the male coupling half is urged into the female body extension 620A of the female coupling half, the first set of detents 607 is first urged radially outwardly and then as the coupling progresses further and the sliding sleeve 608 is pushed against spring 608E, the first set of detents 607 is urged inwardly into the ball race 614 or external recess of the male body extension 610A locking the sliding sleeve 608 of the female coupling half to the male body of the male coupling half. This locks the sliding sleeve 608 of the female coupling half to the male body of the male coupling half in all positions other than the disconnected position with the valves 621, 612 of the male and female coupling halves closed.

When fully connected or coupled, the second set of detents 630 is urged radially inwardly by the spring biased 605D locking ring 605 into engagement with a second ball race 608C or recess extending circumferentially about the exterior of the sliding sleeve 608. The locking ring 605 secures the sliding sleeve 608 in the connected or coupled position.

If the locking sleeve 606 of the male coupling half is attempted to be rotated under the influence of a person's hand to disconnect (or under the influence of mechanical vibration), the sliding sleeve 608 (which is locked 607/614 to the male body) prevents any axial movement and prevents disconnection (uncoupling) of the coupling halves. Only when the outer sleeve 601 of the female coupling half is urged against the force of the third spring 601A and engages a shoulder 605A on the locking ring 605 and thus axially moves the locking ring 605 will the second set of detents 630 release the sliding sleeve to travel or move axially toward the first, closed position. It is not necessary to hold the outer sleeve 601 in its retracted position permanently while uncoupling as the detents 630 move radially outwardly positioning the locking ring 105 appropriately. While this is occurring the first set 607 of detents remain locked 607/614 to the male coupling half until the sliding sleeve 608 is moved axially to the first, closed position where the first set of balls/detents 607 are free to move radially outwardly into a recess 620F in the female body extension of the female coupling halves.

A coupling half 600 for coupling and uncoupling with another coupling half 650 includes a valve 621, a body 620 and a body extension 620A affixed to the body 620. The valve 621 is affixed to the body 620. The coupling half 600 further includes a sliding sleeve 608 and a locking ring 605. The locking ring 605 is movable with respect to the body extension 620A between first and second positions. The first position of the locking ring 605 is shown in FIG. 6 when the coupling halfs are uncoupled. The second position of the locking ring 605 is illustrated in FIG. 7 when the coupling halfs are coupled. The body 620 and the body extension 620A are substantially concentric and the sliding sleeve resides substantially radially intermediate the body 620 and the body extension 620A. A snap ring 633 is affixed to the body extension 620A in a circumferential groove 633A in the exterior of the body extension. The sliding sleeve 608 is movable between first and second positions with respect to the body, the body extension 620A and the valve 621 thus closing (first position of the sliding sleeve 608, FIG. 6) the valve and opening (second position of the sliding sleeve 608, FIG. 7) the valve 621. A closing mechanism includes first 607 and second 630 sets of locking detents. The first set of locking detents 607 interengaging the another coupling half (male coupling half 650) when the sliding sleeve 608 is in the second position (FIG. 7). The second set of locking detents 630 interengaging the sliding sleeve 608 when the sliding sleeve is in the second position (FIG. 7). The closing mechanism includes a first spring 608E operable between the body 620 and the sliding sleeve 608. A second spring 605D is operable between the snap ring 633 and the locking ring 605. The second spring 605D being compressed when the coupling halves are uncoupled (FIG. 6) and the locking ring 605 is in the second position and the second spring 605D being extended when the coupling is coupled (FIG. 7) and the locking ring is in the first position. The closing mechanism insures that the sliding sleeve 608 is returned to the closed position (first position of the sliding sleeve 608, FIG. 6) closing the valve 621 when the coupling half is uncoupled.

REFERENCE NUMERALS

2—female coupling half
3—male coupling half 3
4—hole or passageway for the communication of fluid
5—valve or bolt
7—tubular body shutoff
8—spring
18, 19—valve in the male coupling half 3 of the prior art
9—annular sleeve
10—spring
17"—seal
40—male body
100—quarter-sectional view of the female coupling half of the first example
101—outer retractable sleeve
101A—third spring 101B—internal surface of outer retractable sleeve 101
103—cover
105—locking ring
105A—outer surface of locking ring
105B—recess in the locking ring
105C—inner surface of locking ring
105D—spring
106—locking sleeve
106A—threads
106B—interface between the rotatable locking sleeve
106C—detents or balls
106D—aperture
106E—plug for the pathway 106D for the insertion of the balls
107—first set of movable detents
108—sliding sleeve
108A—exterior surface of sliding sleeve
108B—apertures
108C—circumferentially extending recess or (second) ball race
108D—inner surface of sliding sleeve valve
108E—first spring
108F—surface
108G—surface
110—male body
110A—male body extension
110B—ball race or recess 110B
110C—threads
110D—seal surface
110E—seal surface
110J—indicates a flow passageway
112—valve
112A—ports or apertures
113—flat face of the male coupling half
114—ball race or recess
120—female body
120A—female body extension
120B—threads
120C—inner surface of female body extension
120D—threads
120E—outer surface of female body extension
120F—recess in the female body extension 120A
120J—passageway
121—pintle or valve
121A—threads
121B—end portion
121C—radially extending passageways
121D—radially extending passageway
121E—flat face of valve
122—seal
122A—threaded insert for retaining seal 122
123—elastomeric seal
124—seal
125—seal
126—end cap
126A—threads
130—second set of detents
130A—apertures for ball race
140—spring operating between male body 110 and the valve 112
150—quarter-sectional view of the male coupling half of the first example
160—passageway which interconnects radially extending ports 112A and 121C
300—quarter-sectional view of the female coupling half and the male coupling half coupled
400—quarter-sectional view of a prior art female coupling half
400A—quarter-sectional view of a prior art male coupling half
400B—quarter sectional view of a prior art female coupling half and male coupling half coupled.
405—valve or bolt
407—tubular body shutoff
409—sleeve
414—closed wall of a tubular bolt
417—seal
419—shutoff surface
422—spring
430—seal
440—bolt body
443—flat face of valve or bolt 405
451—seal
460—spring
460A—spring
490—threads on the interior surface of the outer body
491—reciprocal threads on the male coupling half
500—cross-sectional view 500 of a prior art female
600—cross-sectional view of the female coupling half of the second example
600A—enlarged female coupling half of the second example
600B—enlarged male coupling half of the first example
600C—enlarged portion of female coupling half
600D—enlarged portion of male coupling half
601—outer retractable sleeve
601A—third spring of second example
601B—internal surface of outer retractable sleeve 601
601C—outer surface of retractable sleeve 601
601D—shoulder on inner surface of retractable sleeve 601
603—cover
603A—lip on body 620
603D—recess in body 620
605—locking ring
605A—outer surface of locking ring
605B—recess in the locking ring
605C—inner surface of locking ring
605D—spring
606—locking sleeve
606A—coarse threads
606B—interface between the rotatable locking sleeve and the male body
606C—detents or balls
606D—aperture
607—first set of movable detents
608—sliding sleeve
608A—exterior surface of sliding sleeve
608B—apertures
608C—circumferentially extending recess or (second) ball race
608D—inner surface of sliding sleeve valve
608E—first spring of second example
608F—surface
608G—surface
610—male body
610A—male body extension
610B—ball race or recess
610C—threads
610D—seal surface
610E—seal surface
610J—indicates a flow passageway
612—valve
612A—ports or apertures
613—flat face of the male coupling half 614—ball race or recess
620—female body
620A—female body extension
620B—threads
620C—inner surface of the female body extension 620A
620D—threads
620E—outer surface of the female body extension 620A
620F—recess in the female body extension 120A
620J—passageway
621—pintle or valve
621A—threads
621B—end portion
621C—radially extending passageways
621E—flat face of valve
622—seal
623—elastomeric seal
624—seal
625—seal
626—end cap
626A—threads
630—second set of detents
631—threaded insert for trapping seal 622
631A—threads
632—plug
632A—plug threads
633—snap ring support for second spring 605D
633A—circumferential groove in the body extension 620A
632A—plug threads
640—spring operating between male body 610 and the valve 612
650—cross-sectional view of the male coupling half of the second example
660—passageway which interconnects radially extending ports 612A and 621C
671—surface of insert 631 which forms a dovetail
671A—surface of sliding sleeve which forms a dovetail
672—lip of flared end on end cap 626

It will be understood by those skilled in the art that the instant invention has been disclosed and described by way of example only and that numerous modifications and deviations of the example may be made without departing from the spirit and scope of the appended claims.

We claim:

1. A coupling comprising: a female coupling half (600) and a male coupling half (650), said female coupling half and said male coupling half being alternately coupled and uncoupled;
said male coupling half comprises: a male body (610); a male body extension (610A); said male body extension includes an exterior; said exterior of said male body of said male half includes a recess (614) therein which extends circumferentially around said exterior thereof;
said female coupling half comprises: a valve (621); a female body (620); a female body extension (620A) affixed to said female body of said female coupling half; a sliding sleeve (608) movable with respect to said female body, said female body extension and said valve; an insert (631), said insert affixed to said sliding sleeve; a seal (622), said seal restrained by said insert against said sliding sleeve and said valve; said sliding sleeve movable between: a first position abutting said valve and closing said valve, and, a second position not abutting said valve thus opening said valve; said sliding sleeve of said female coupling half includes a first set of detents (607) carried therewith; said female body extension of said female coupling half includes a second set of detents (630) therein; said sliding sleeve of said female coupling half includes an exterior (608A) having a circumferentially extending recess (608C) therein; and, wherein said second set of detents interengages (630) said recess (608C) in said exterior of said sliding sleeve during coupling of said coupling halves;
said male body (610) of said male coupling half interengaging said sliding sleeve (608) of said female coupling half during engagement therewith moving said sliding sleeve from said first closed position to said second open position; and,
said first set of detents (607) of said sliding sleeve (608) of said female coupling interengaging said circumferentially extending recess (614) in said exterior of said male body extension (610A) during coupling of said coupling halves.

2. A coupling comprising: a female coupling half and a male coupling half as claimed in claim 1 wherein: said female body extension (620A) includes an inner surface (620C) and an outer surface (620E) and said inner surface interengages and locks said first set of detents (607) interengaging said recess (614) in said male body (610) of said male coupling half during coupling; and, said female coupling half includes a locking ring (605) having an inner surface (605C) and an outer surface (605A), said locking ring resides radially outwardly of said female body extension of said female coupling half, and said inner surface of said locking ring being in sliding engagement with said female body extension of said female coupling half during coupling locking and interengaging said second set of detents (630) interengaging said recess (608C) in said exterior surface of said sliding sleeve valve of said female coupling half.

3. A coupling comprising a female coupling half and a male coupling half as claimed in claim 2, further comprising a circumferential groove (633A) in said outer surface of said female body extension (620A); a snap ring (633) residing in said circumferential groove (633A) in said outer surface of said female body extension (620A), and wherein: a first spring (608E) is operable between said body (620) and said sliding sleeve (608) urging said sliding sleeve longitudinally outwardly; and, a second spring (605D) is operable between said snap ring (633) in said annular groove in said outer surface of said female body extension and said locking ring (605) urging said locking ring longitudinally outwardly locking said second set of detents in said exterior recess of said sliding sleeve.

4. A coupling comprising: a female coupling half and a male coupling half as claimed in claim 3 wherein: said female coupling half includes an outer sleeve (601) having an inner surface (601B) and an outer surface (601C), said inner surface having a shoulder (601D) thereon; and, during uncoupling, said shoulder (601D) on said inner surface of said outer sleeve engaging said locking ring (605A) moving said locking ring releasing said second set of detents (630) from said recess (608) in said exterior surface of said sliding sleeve (608) which in turn releases said sliding sleeve enabling movement of said sliding sleeve to said first closed position abutting said valve; and, said first set of detents (607) being released from interengagement with said circumferentially extending recess (614) in said exterior of said male body of said male coupling half during uncoupling said halves each from the other after said sliding sleeve (608) is moved to said first position abutting said valve of said female coupling half.

5. A coupling comprising a female coupling half and a male coupling half as claimed in claim 4 wherein said female body extension (620A) includes a recess (620F) in said inner surface (620C) thereof and said first set of detents (607) is released when said first set of detents carried with said sliding sleeve is positioned adjacent said recess (620F) in said inner surface (608C) of said female body extension (620A).

6. A coupling comprising a female coupling half and a male coupling half as claimed in claim 5 wherein: said male coupling half includes a locking sleeve (606) having an interior and an exterior, said interior of said locking sleeve having coarse threads (606A) thereon; and, said female body extension includes coarse threads (620D) on said exterior thereof which interengage said coarse threads of said interior of said locking sleeve of said male coupling half during coupling of said halves each to the other.

7. A coupling comprising a female coupling half and a male coupling half as claimed in claim 6 wherein: said male and female coupling halves each include a surface having threads (606A, 620D) thereon for interconnecting said coupling halves; and, said threaded surfaces do not traverse said first set of detents during coupling and uncoupling.

8. A coupling comprising: a female coupling half and a male coupling half as claimed in claim 1 wherein said insert (631) includes a first dovetail surface (671) and wherein said sliding sleeve includes a second dovetail surface (671A), said first and second dovetail surfaces restrain said seal (622).

9. A coupling comprising: a female coupling half and a male coupling half as claimed in claim 1 wherein said male coupling half (650) includes a valve (612) and an end cap (626) threaded thereto, and said threaded end cap includes a flared end (672).

10. A coupling half (600) for coupling and uncoupling with another coupling half (650), comprising: a valve (621); a body (620) and a body extension (620A) affixed to said body; said valve affixed to said body; a sliding sleeve (608) and a locking ring (605); said locking ring movable with respect to said body extension between first and second positions; said body and said body extension are substantially concentric and said sliding sleeve resides substantially radially intermediate said body and said body extension; a snap ring (633) affixed to said body extension; said sliding sleeve (608) movable between first and second positions with respect to said body, said body extension (620A) and said valve (621) thus closing said valve when said sliding sleeve is in said first position and opening said valve when said sliding sleeve is in said second position; a closing mechanism; said closing mechanism includes first (607) and second (630) sets of locking detents; said first set of locking detents (607) interengaging said another coupling half (650) when said sliding sleeve is in said second position; said second set of locking detents (630) interengaging said sliding sleeve (608) when said sliding sleeve is in said second position; said closing mechanism includes a first spring (608E) operable between said body and said sliding sleeve; a second spring (605D) operable between said snap ring (633) and said locking ring (605), said second spring (605D) being compressed when said coupling is uncoupled and said locking ring (605) is in said second position and said second spring being extended when said coupling is coupled and said locking ring (605) is in said first position; and, said closing mechanism insures that said sliding sleeve (608) is returned to said closed, first, position closing said valve when said coupling half is uncoupled.

11. A coupling half for coupling and uncoupling with another coupling half as claimed in claim 10 wherein said first set of locking detents (607) is carried by said sliding sleeve.

12. A coupling half for coupling and uncoupling with another coupling half as claimed in claim 11 wherein said second set of locking detents (630) is carried by said body extension.

* * * * *